US012734771B2

(12) United States Patent
Ahn et al.

(10) Patent No.: US 12,734,771 B2
(45) Date of Patent: Sep. 15, 2026

(54) SYSTEMS AND METHODS FOR LOCALLY CURING COMPOSITE STRUCTURES

(71) Applicant: The Boeing Company, Arlington, VA (US)

(72) Inventors: Jonathan Y. Ahn, Seattle, WA (US); Xiaoxi Wang, Mukilteo, WA (US); Jill E. Seebergh, Seattle, WA (US); Shuonan Dong, Seattle, WA (US)

(73) Assignee: The Boeing Company, Arlington, VA (US)

( * ) Notice: Subject to any disclaimer, the term of this patent is extended or adjusted under 35 U.S.C. 154(b) by 81 days.

(21) Appl. No.: 18/655,574

(22) Filed: May 6, 2024

(65) Prior Publication Data

US 2025/0340026 A1 Nov. 6, 2025

(51) Int. Cl.
*B29C 73/12* (2006.01)
*B29L 31/30* (2006.01)

(52) U.S. Cl.
CPC ....... *B29C 73/12* (2013.01); *B29L 2031/3085* (2013.01)

(58) Field of Classification Search
None
See application file for complete search history.

(56) References Cited

U.S. PATENT DOCUMENTS 2,420,522 A 5/1947 Grand
4,915,896 A * 4/1990 Rachal .................. B29C 70/342 264/102
11,046,027 B2 6/2021 Wang et al.
11,292,208 B2 4/2022 Georgeson et al.
11,298,892 B2 4/2022 Santiago et al.
11,325,282 B2 5/2022 Wang et al.
11,426,951 B2 8/2022 Wang et al.
11,673,366 B2 6/2023 Wang et al.
11,787,914 B2 10/2023 Wang et al.
11,833,766 B2 12/2023 Santiago et al.
11,872,776 B2 1/2024 Wang et al.
2007/0080481 A1 4/2007 Kismarton
2012/0084999 A1* 4/2012 Davis .................. B29C 37/0067 156/289
2021/0001519 A1 1/2021 Wang et al.
2021/0261232 A1 8/2021 Georgeson et al.
2022/0169820 A1 6/2022 Wang et al.
2023/0009001 A1 1/2023 Wang et al.
2023/0011302 A1 1/2023 Wang et al.
2023/0011358 A1 1/2023 Wang et al.
2024/0002624 A1 1/2024 Wang et al.
2024/0059029 A1 2/2024 Santiago et al.

FOREIGN PATENT DOCUMENTS

EP 3695947 A1 8/2020

OTHER PUBLICATIONS

European Patent Office, Extended European Search Report, App. No. 25174072.6 (Sep. 11, 2025).

* cited by examiner

*Primary Examiner* — Christopher T Schatz
(74) *Attorney, Agent, or Firm* — Walters & Wasylyna LLC

(57) ABSTRACT

A system for locally curing a composite structure includes a constraining container including a cover and having an interior volume. The cover is configured to enclose a portion of a composite structure. The system includes a retainer configured to hold the cover against the composite structure. The system included an expandable medium configured to be disposed within the interior volume of the cover between the walls and the composite structure.

20 Claims, 9 Drawing Sheets

100
106
102
250
112
114
164
206
142
200
104
112

100
114
106
102
250
112
164
200
112
130
130
206
142
104

100
130
114
130
250
102
112
112
206
142
106
104

SYSTEMS AND METHODS FOR LOCALLY CURING COMPOSITE STRUCTURES

FIELD

The present disclosure relates generally to composite manufacturing and, more particularly, to systems and methods for locally curing composite structures.

BACKGROUND

Engineered composite materials are used in many applications, typically where the composite material can be made stronger, lighter, and/or less expensively than a traditional material. A variety of modern composite materials exist, but the most common are varieties of fiber-reinforced polymer composites, such as fiberglass or carbon fiber composites. For many composite materials, the manufacturing process includes curing the composite structure, typically under elevated temperatures and pressures. An industrial autoclave is often used for curing composite materials, as autoclaves permit the application of both temperature and pressure under controlled conditions. However, processes requiring an autoclave may lead to bottlenecks in the manufacturing process, because throughput is dependent upon the capacity of the autoclave and requires transport of raw materials or uncured components to the autoclave and subsequent transport of the cured composite from the autoclave. Additionally, autoclave curing is not typically available for spot curing, repair, and remote curing needs. Accordingly, those skilled in the art continue with research and development efforts in composite manufacturing.

SUMMARY

Disclosed are examples of a system for locally curing a composite structure, a method for locally curing a composite structure, and a composite workpiece. The following is a non-exhaustive list of examples, which may or may not be claimed, of the subject matter according to the present disclosure.

In an example, the disclosed system includes a constraining container including a cover and having an interior volume. The cover is configured to enclose a portion of a composite structure. The system includes a retainer configured to hold the cover against the composite structure. The system included an expandable medium configured to be disposed within the interior volume of the cover between the walls and the composite structure.

In an example, the disclosed method includes steps of: (1) enclosing a portion of a composite structure in a constraining container; (2) holding a cover of the constraining container against the composite structure; (3) expanding an expandable medium disposed within an interior volume formed by the cover and the composite structure; and (4) curing the composite structure.

In an example, the disclosed composite workpiece includes a composite structure including a plurality of composite layers. At least a portion of the plurality of composite layers is uncured or partially cured. A portion of the composite structure is supported by a base. The portion of the composite structure is enclosed by a cover having an interior volume. An expandable medium is disposed within the interior volume between the cover and the composite structure and is configured to expand to a predetermined volume when a predetermined change is produced in an attribute of the expandable medium such that the expandable medium applies positive pressure to the composite structure and the walls of the cover.

Other examples of the system, the method, and the composite workpiece will become apparent from the following detailed description, the accompanying drawings, and the appended claims.

DETAILED DESCRIPTION

Figure 1:
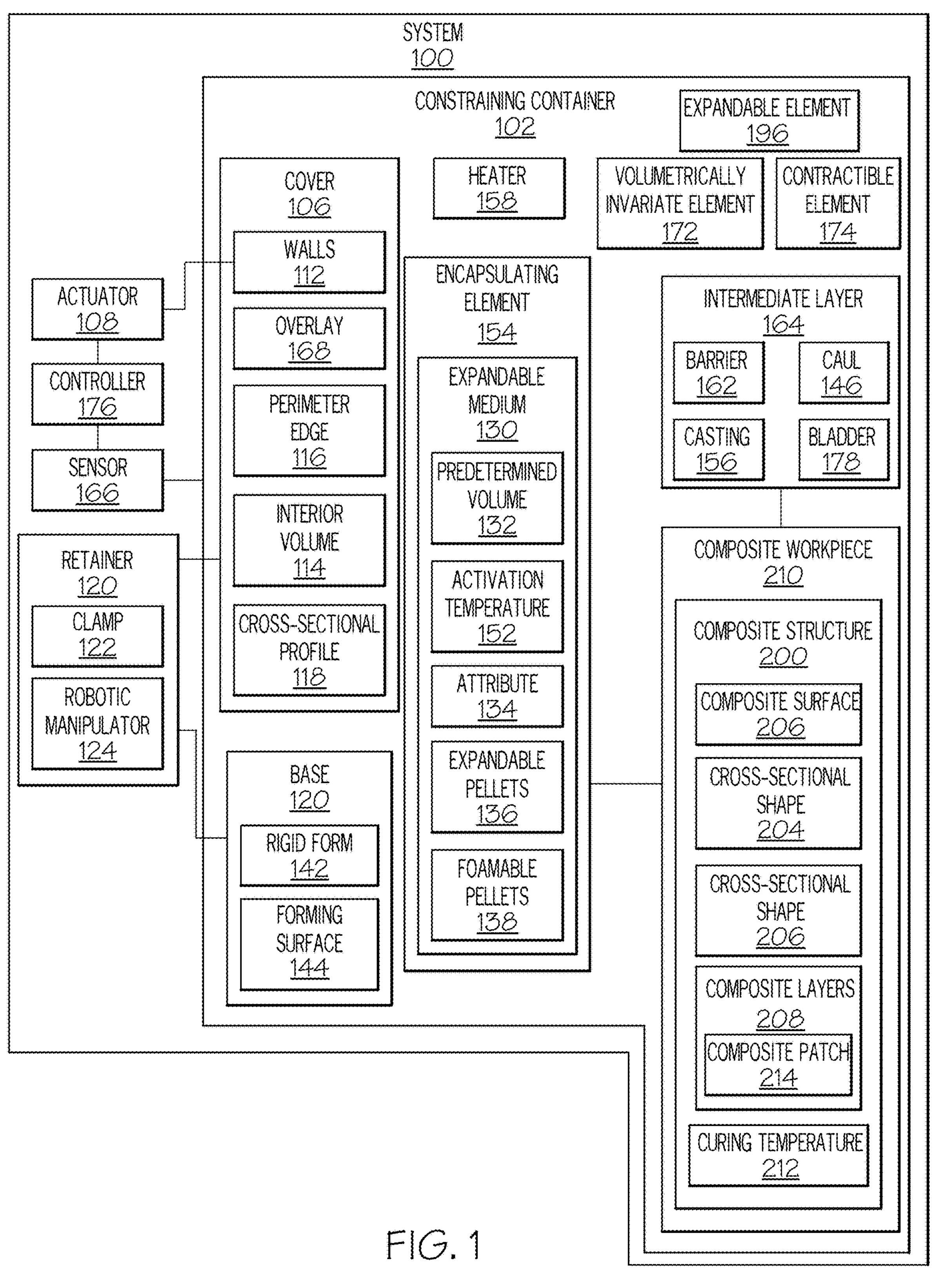
FIG. 1 is a schematic block diagram of a system for locally curing a composite structure.

Referring generally to FIGS. 1-10, by way of examples, the present disclosure is directed to a system 100 and a method 1000 for locally curing a composite structure 200. Examples of the system 100 and method 1000 provide "out of autoclave" curing that achieves substantially the same quality of composite component as an autoclave, without requiring treatment within the autoclave or the need for large, high capital equipment. The curing process enabled by the system 100 and/or according to the method 1000 facilitates cheaper, faster, and smaller footprint curing. The curing process enabled by the system 100 and/or according to the method 1000 also facilitates repairing cured composite parts (e.g., post-cured autoclave parts), which eliminates the requirement of a second cure in an autoclave.

The present disclosure recognizes that many composite parts require autoclaves, which exert heat and pressure, to cure (harden) the composite. The use of autoclaves requires extensive floorspace for equipment and high energy costs. Examples of the system 100 and method 1000 disclosed herein enable the use of expandable materials, such as foams, for applying the pressure required for curing, along with options for controlled heating.

In various examples, a portion of a precured or partially cured composite part is enclosed or otherwise constrained within a curing container. Generally, the container is designed to accommodate the shape and geometry of the composite part and contain the expandable material. In various examples, the expandable material is located between the container and the composite part. In various examples, the expandable material is activated to expand within the container. In various examples, heat is used to activate the expandable material. In some examples, heat is also used as a catalyst for composite curing.

Advantages of the system 100 and method 1000 include eliminating and/or reducing the need for large autoclave usage and improving factory layout and energy usage. Examples of the system 100 and method 1000 also provide utilization of expandable materials in combination heating to cure composites. Additionally, smaller repair patchwork can be isolated, as opposed to re-entry into autoclave for curing. Further, examples of the system 100 and method 1000 provide options for curing and/or repairing composite parts outside of a factory or other manufacturing environment.

Referring now to FIGS. 1 and 3-10, the following are examples of the system 100, according to the present disclosure. The system 100 includes a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

FIG. 1 is a schematic block diagram that depicts one or more examples of the system 100. As will be described in more detail herein, in various examples, the system 100 includes a number of components, including one or more of a constraining container 102, a cover 106, a base 104, walls 112, an overlay 168, a retainer 120, a clamp 122, a robotic manipulator 124, an expandable medium 130, a rigid form 142, a forming surface 144, an intermediate layer 164, a caul 146, a barrier 162, a casting 156, an encapsulating element 154, a bladder 178, a heater 158, an actuator 108, a sensor 166, and a controller 176.

FIGS. 3-10 illustrate various examples of the system 100 depicted in use to locally cure a portion 202 of the composite structure 200. Generally, the portion 202 of the composite structure 200 refers to a portion of the composite structure 200 to be locally cured. As examples, the portion 202 includes or refers to at least one portion of the composite structure 200 that is uncured, that is partially cured, or that needs repair.

In various examples, the system 100 is an adjustable tooling system that includes the constraining container 102 and the expandable medium 130 (FIGS. 5-8). The constraining container 102 is selectively located relative to the composite structure 200 such that at least the portion 202 of the composite structure 200 and the expandable medium 130 are positioned within or are otherwise constrained by the constraining container 102. The system 100 is configured to facilitate the application of positive pressure upon the portion 202 of the composite structure 200 by the expansion of the expandable medium 130 during the process of locally curing the portion 202 of the composite structure 200. In various examples, the composite structure 200 is uncured, is partially cured, or needs repair. The constraining container 102 and the expandable medium 130 are configured to apply positive pressure to the composite structure 200 during the process of curing the composite structure 200.

Referring to FIG. 1, in various examples, the composite structure 200 is a composite part, component, object, etc. that includes one or more composite layers 208 (also called plies) that are adhered together by curing (e.g., by application of heat and/or pressure). The composite structure 200 can include any suitable number of the composite layers 208. In various examples, the composite structure 200 includes one or more polymer materials, thermoplastic materials, thermosetting materials, fiber reinforcement materials, and/or any other suitable materials depending on the desired properties for the finished workpiece. In one or more examples, at least a portion of the composite layers 208 is uncured, partially cured, or is a repair patch or charge (e.g., composite patch 214). In one or more examples, an activation temperature 152 of the expandable medium 130 (e.g., expandable pellets 136) is less than a curing temperature 212 of the composite layers 208, for example, of at least the portion of the composite layers 208 that is uncured, partially cured, or formed by a repair patch (e.g., composite patch 214). In one or more examples, the activation temperature 152 of the expandable medium 130 (e.g., expandable pellets 136) is at least the curing temperature 212 of the composite layers 208, for example, of at least the portion of the composite layers 208 that is uncured, partially cured, or formed by a repair patch (e.g., composite patch 214). In one or more examples, the activation temperature 152 of the expandable medium 130 (e.g., expandable pellets 136) is greater than the curing temperature 212 of the composite layers 208, for example, of at least the portion of the composite layers 208 that is uncured, partially cured, or formed by a repair patch (e.g., composite patch 214).

Referring to FIGS. 1 and 3-10, in one or more examples, the cover 106 forms a portion of the constraining container 102, such as examples in which at least the portion 202 of the composite structure 200 is supported by the base 104. In one or more examples, the cover 106 forms an entirety of the constraining container 102, such as in examples in which at least the portion 202 of the composite structure 200 is supported by another reinforcement or is otherwise not backed up. The cover 106 is selectively located relative to the composite structure 200 such that at least the portion 202 of the composite structure 200 and the expandable medium 130 are positioned within or are otherwise constrained by the cover 106. In these examples, the cover 106 includes (e.g., forms or defines) the interior volume 114 and is configured to enclose the portion 202 of the composite structure 200.

In one or more examples, the cover 106 is substantially resistant to expansion, at least when pressure is applied on inner surfaces of the cover 106. In this way pressure applied to an outer surface (e.g., composite surface 206) of the composite structure 200 acts cooperatively with the cover 106 to generate compressive force upon the composite structure 200.

Figure 3:
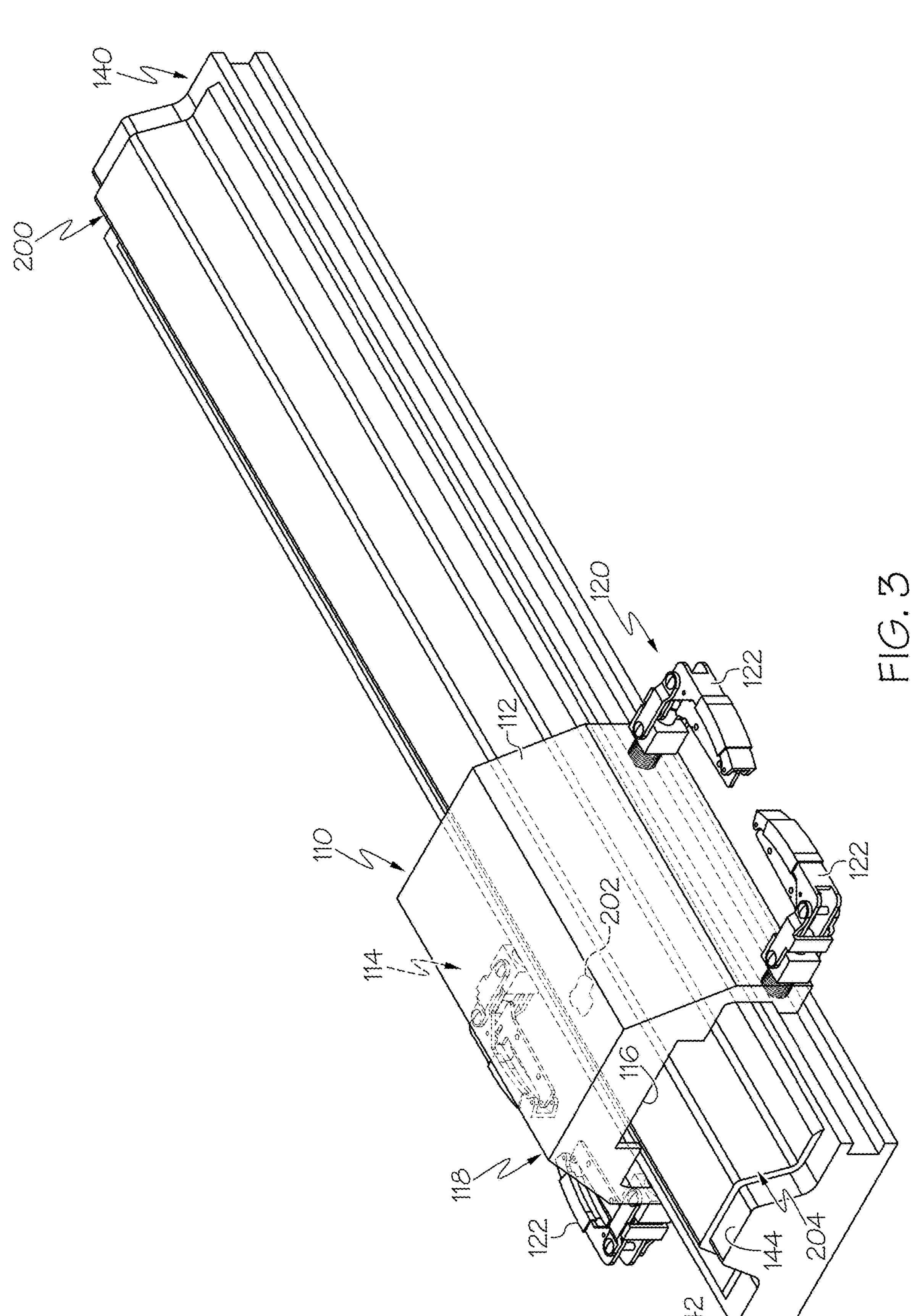
FIG. 3 is a schematic, perspective view of an example of the system.

Referring to FIG. 3, in one or more examples, the cover 106 is movable relative to the composite structure 200 such that the portion 202 of the composite structure 200 to be cured can be selected, isolated, and/or targeted. Moving the cover 106 facilitates local curing of discrete areas or portions on composite structure 200. In one or more examples, the cover 106 is completely removable from the composite structure 200, such as after curing.

In one or more examples, the cover 106 is sized and/or has appropriate dimensions suitable to cover at least the portion 202 to be cured. In these examples, the dimensions (e.g., length and/or width) of the cover 106 are less than at least one of the dimensions (e.g., length and/or width) of the composite structure 200. As illustrated in FIG. 3, in one or more examples, the cover 106 is movable and is selectively located along the length of the composite structure 200.

Referring to FIGS. 1 and 4-10, the cover 106 has a cross-sectional profile 118. In one or more examples, the cross-sectional profile 118 of the cover 106 corresponds to the cross-sectional shape 204 of the composite structure 200. At least approximately matching the cross-sectional profile 118 of the cover 106 with the cross-sectional shape 204 of the portion 202 of the composite structure 200 being cured facilitates a reduction in the interior volume 114 needed to be filled by the expandable medium 130 upon expansion.

Referring to FIGS. 1 and 3-6 and 9, in one or more examples, the cover 106 includes the walls 112. In one or more examples, the walls 112 form or define at least a portion of the interior volume 114. In one or more examples, the walls 112 have or form the cross-sectional profile 118 of the cover 106 that corresponds to the cross-sectional shape 204 of the composite structure 200.

In these examples, the expandable medium 130 is configured to be disposed within the interior volume 114 of the cover 106 formed by the walls 112. In one or more examples, the expandable medium 130 is disposed between the walls 112 and the portion 202 of the composite structure 200.

In one or more examples, at least a portion of the cover 106, such as the walls 112 of the cover 106, are rigid (e.g., hard or non-flexible) and non-expandable. In these examples, at least a portion of the cover 106, such as the walls 112, can be made out of any suitable material, including, but not limited to, metallic materials, composite materials, cement materials, ceramic materials, polymeric materials, and the like. In these examples, the walls 112 constrain the expandable medium 130 and react to the positive pressure generated by the expandable medium 130 upon expanding. In these examples, the walls 112 are capable of withstanding the pressure generated within the constraining container 102 upon expansion of the expandable medium 130.

Figure 7:
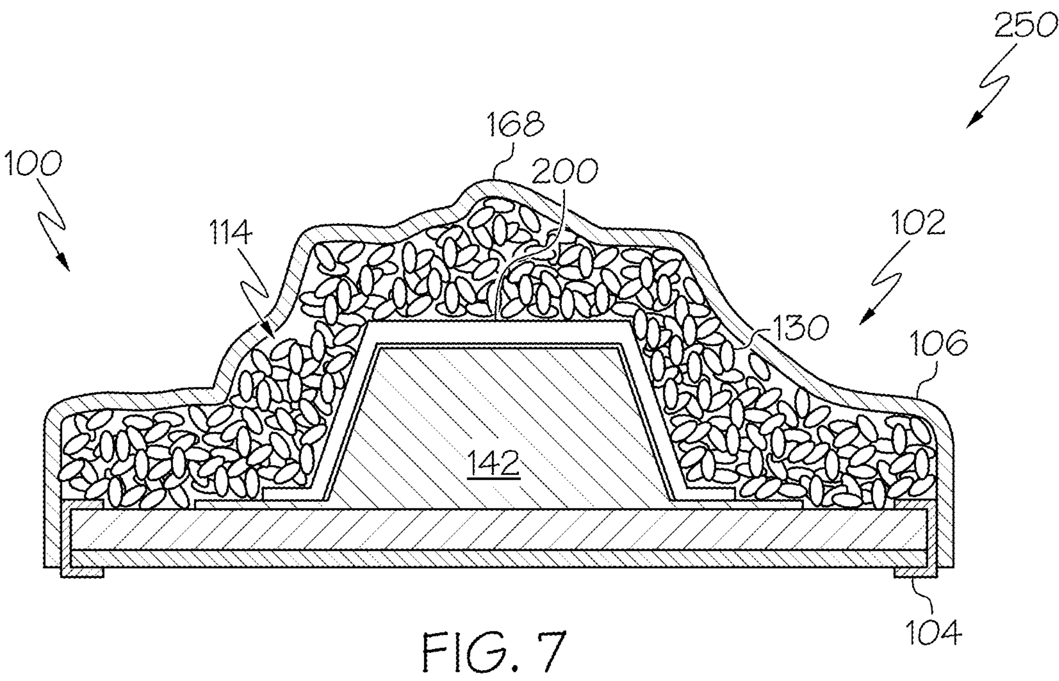
FIG. 7 is a schematic, sectional view of another example of the system with an expandable medium disposed within an interior volume of the constraining container.
Figure 8:
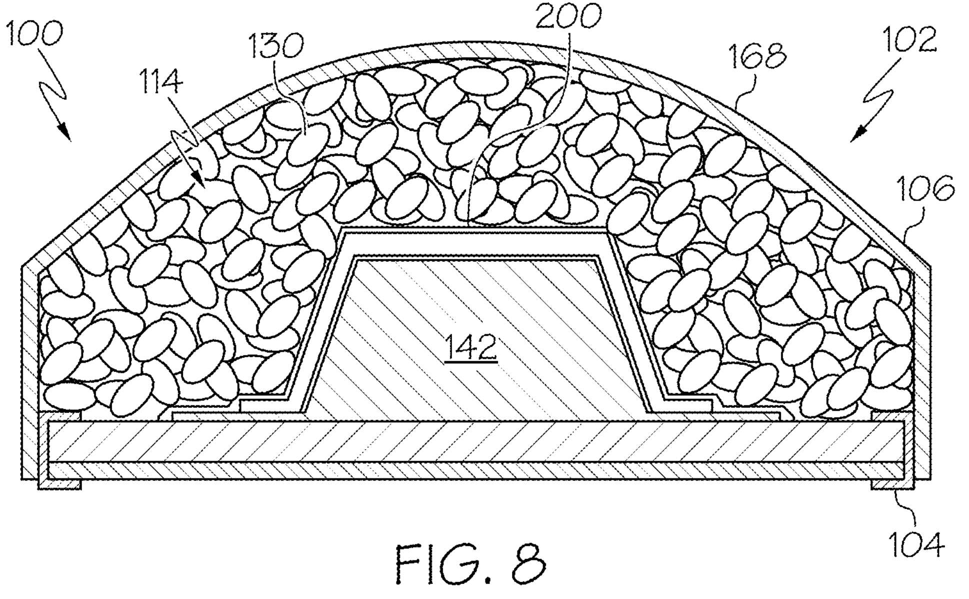
FIG. 8 is a schematic, sectional view of an example of the system shown in FIG. 7 after expansion of the expandable medium.

Referring to FIGS. 1, 7 and 8, in one or more examples, the cover 106 includes the overlay 168. In one or more examples, the overlay 168 forms or defines at least a portion of the interior volume 114. In one or more examples, the overlay 168 has or forms the cross-sectional profile 118 of the cover 106 that corresponds to the cross-sectional shape 204 of the composite structure 200.

In these examples, the expandable medium 130 is configured to be disposed within the interior volume 114 of the cover 106 formed by the overlay 168. In one or more examples, the expandable medium 130 is disposed between the overlay 168 and the portion 202 of the composite structure 200.

In one or more examples, at least a portion of the cover 106, such as the overlay 168 of the cover 106, is flexible and non-expandable. As illustrated in FIG. 7, use of the overlay 168 enables the cover 106 to form over (e.g., more closely match) the profile shape of the composite structure 200 and/or the expandable medium 130 disposed between the cover 106 and the composite structure 200 before expansion of the expandable medium 130. In these examples, at least a portion of the cover 106, such as the overlay 168, can be made out of any suitable material, including, but not limited to, metallic mesh (e.g., chainmail), ceramic mesh, polymeric mesh, and the like. In these examples, the overlay 168 constrains the expandable medium 130 and reacts to the positive pressure generated by the expandable medium 130 upon expanding. In these examples, the overlay 168 is capable of withstanding the pressure generated within the constraining container 102 upon expansion of the expandable medium 130.

In one or more examples, at least a first portion of the cover 106 is flexible and non-expandable and at least a second portion of the cover 106 is rigid and non-expandable. As an example, the cover 106 can include the overlay 168 and at least one wall 112. In other examples, at least a first portion of the cover 106 is non-expandable (e.g., flexible and/or rigid) and at least a second portion of the cover 106 is expandable.

Referring to FIGS. 1 and 3, in one or more examples, the cover 106 includes a perimeter edge 116. At least a portion of the perimeter edge 116 is configured to contact a composite surface 206 of the composite structure 200. Contact between the perimeter edge 116 of the cover 106 and the composite surface 206 of the composite structure 200 facilitates containment of the expandable medium 130 disposed within the interior volume 114. In these examples, the portion 202 of the composite structure 200 is situated within or is bound by the perimeter edge 116 of the cover 106.

In one or more examples, at least the portion of the perimeter edge 116 of the cover 106 is configured to be sealed to the composite surface 206 of the composite structure 200. Sealing the perimeter edge 116 of the cover 106 to the composite surface 206 of the composite structure 200 enables vacuum pressure (e.g., negative pressure) to be used during the curing process and/or as a means to retain the cover 106 in position on the composite surface 206.

Referring to FIG. 1, in one or more examples, the interior volume 114 of the cover 106 is selectively (e.g., controllably) variable. In one or more examples, at least one of the walls 112 of the cover 106 is movable to modify (e.g., reduce) the interior volume 114 of the cover 106. Selective modification or variation of the interior volume 114 facilitates a reduction in the interior volume 114 and a corresponding reduction in the amount of expandable medium 130 required to fill the interior volume 114 upon expansion.

Referring to FIG. 1, in one or more examples, at least one of actuator 108 is used to selectively move at least one of the walls 112 of the cover 106 for varying the interior volume 114 of the cover 106. In these examples, the actuator 108 is coupled to the wall 112. Actuation of the actuator 108 moves the wall 112. The actuator 108 can include any suitable type of controllable actuation device, such as a mechanical actuator, a pneumatic actuator, a linear actuator, a rotary actuator, and the like.

In one or more examples, the sensor 166 is configured to detect or otherwise determine the positive pressure or force being applied by the expandable medium 130 during expansion of the expandable medium 130. In these examples, the controller 176 (FIG. 1) receives an input signal or data from the sensor 166 and controls the actuator 108 such that the interior volume 114 can be increased or decreased as required to maintain a desire pressure applied to the composite structure 200. The sensor 166 can include any suitable type or number of pressure sensor, load sensor, or other sensor device.

In one or more examples, the controller 176 includes or takes the form of a closed-loop controller or otherwise utilizes closed-loop control of the pressure within the constraining container 102 and/or applied to the composite structure 200. In one or more examples, the interior volume 114 can be changed per real-time pressure measured by the sensor 166. Closed-loop control can beneficially improve the quality of composite manufacturing and repair because a closed-loop control mechanism can offset a number of variables, such as material batch difference, humidity, environmental temperature and the like. In one or more examples, the controller 176 uses pressure measurements from the sensor 166 to control the pressure within the constraining container 102 and/or applied to the composite structure 200 by increasing or decreasing the interior volume 114, such as by selectively changing the position of one or more of the walls 112 and/or by selectively expanding or contracting the expandable element 196, or by selectively expanding or contracting the expandable medium 130 within the interior volume 114.

In one or more examples, expansion and/or contraction of the expandable medium 130 is selectively controllable. For example, the expandable medium 130 is configured to selectively or controllably expand and contract as a method for controlling the pressure within the constraining container 102 and/or applied to the composite structure 200. In various examples, expansion and/or contraction of the expandable medium 130 can be controlled in any one of various ways, such as applying heat or cooling the expandable medium 130.

In other examples, the system 100 includes other mechanisms to prevent over pressurization and/or to regulate the pressure within the interior volume 114 of the constraining container 102. As an example, the cover 106 can be fixed in place relative to the composite structure 200, for example, coupled to the base 104, by a plurality of shear pins. In these examples, the shear pins are configured to fail upon a predetermined pressure, thereby releasing the cover 106 and relieving the pressure.

In various examples, the cover 106 includes any suitable element or feature that facilitates application and/or removal of the expandable medium 130 from the interior volume 114. In one or more examples, the cover 106 includes removable or openable panels (e.g., doors) that enable access to the interior volume 114 and application of expandable medium 130 once positioned relative to the composite structure 200.

In one or more examples, at least a portion of the cover 106 is thermally reflective. As an example, at least one of the walls 112 of the cover 106 is thermally reflective. As another example, the overlay 168 is thermally reflective. In one or more examples, at least a portion of the interior surface of the cover 106 includes or is coated with a thermally reflective material. Thermal reflectivity of the cover 106 facilitates improved heating of the expandable medium 130 to activate expansion of the expandable medium 130 during the curing process.

Figure 9:
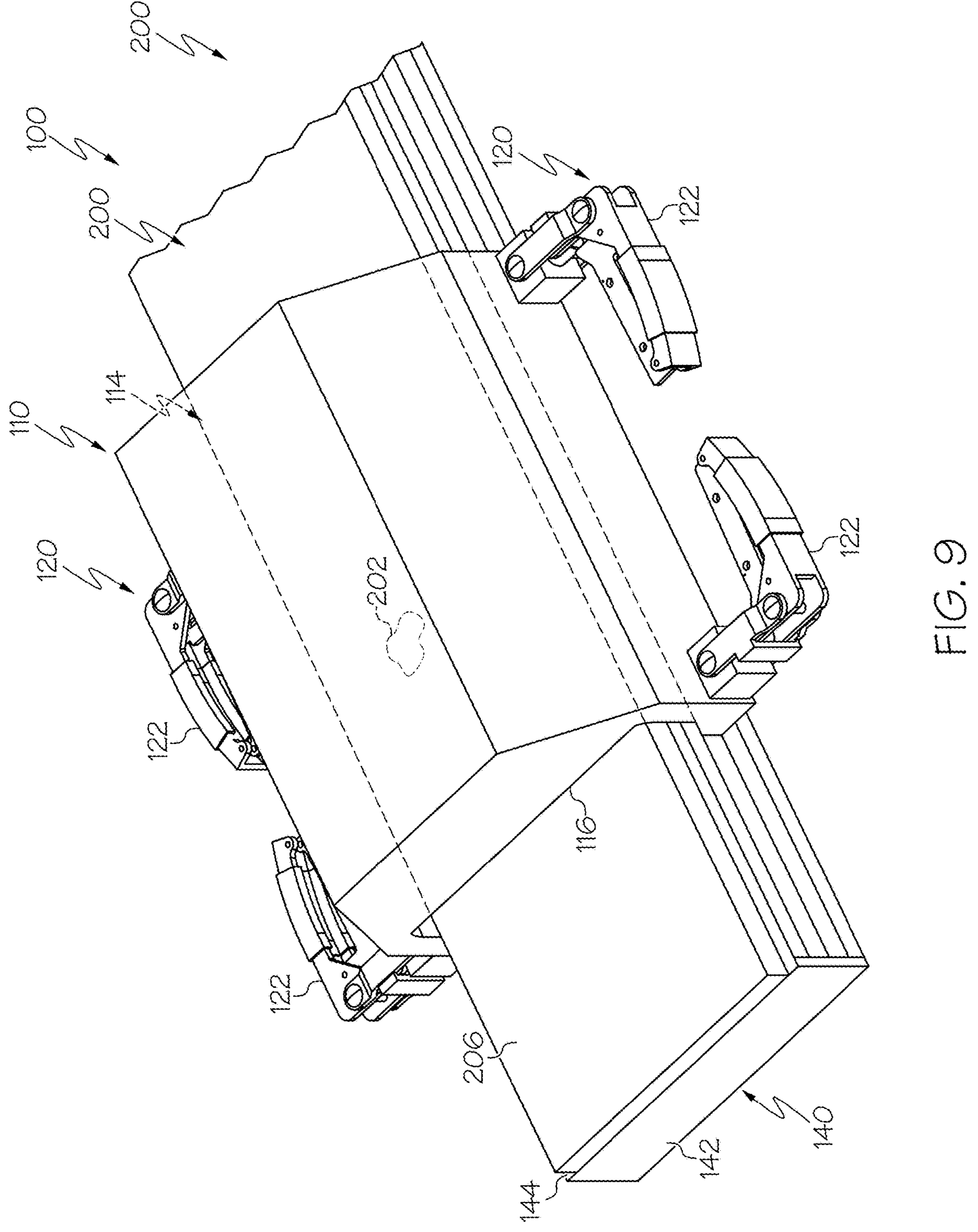
FIG. 9 is a schematic, perspective view of another example of the system.

Referring to FIGS. 1, 3 and 9, in one or more examples, the retainer 120 is configured to hold the cover 106 against the composite structure 200. The retainer 120 includes any suitable mechanism capable of fixing the cover 106 relative to the portion 202 of the composite structure 200 for curing.

In one or more examples, the retainer 120 includes at least one clamp 122. In these examples, the clamp 122 fastens or fixes the cover 106 in place relative to the composite structure 200. In one or more examples, the clamp 122 fastens or fixes the cover 106 to the composite structure 200. In one or more examples, the clamp 122 fastens or fixes the cover 106 to another component (e.g., the base 104 or ancillary structure). The clamp 122 can include any suitable type of clamping device and fastening device, such as, but not limited to, mechanical clamps, magnetic clamps, pneumatic clamps, spring clamps, latches, pins, fasteners, weights, and the like. The retainer 120 can include any number of clamps 122.

Referring to FIG. 1, in one or more examples, the retainer 120 includes the robotic manipulator 124. In these examples, the robotic manipulator 124 holds or fixes the cover 106 in place relative to the composite structure 200. In these examples, the cover 106 is coupled to a working end of the robotic manipulator 124 (e.g., end effector). Under computer control, the robotic manipulator 124 selectively positions the cover 106 relative to the composite structure 200 and retains the cover 106 in the appropriate location for curing the portion 202 of the composite structure 200.

Referring to FIGS. 1 and 3-9, in one or more examples, the base 104 is configured to support the composite structure 200. In one or more examples, the base 104 forms a portion of the constraining container 102. As an example, the composite structure 200 is positioned on or is backed up by the base 104. As another example, the base 104 provides or serves as a structural reinforcement for at least the portion 202 of the composite structure 200 that is enclosed by the cover 106 and that is intended to be locally cured using the system 100.

As illustrated in FIGS. 4-8, the composite structure 200 is disposed on the base 104 during the curing process. In order for suitable compressive forces (e.g., positive pressure) to be applied to the composite structure 200 while it is within the constraining container 102, at least the portion 202 of the composite structure 200 being locally cured may need to be well-supported. In one or more examples, the base 104 provides a substantially non-compressible surface to support an underside of the composite structure 200.

In one or more examples, the base 104 is substantially resistant to compression, at least when pressure is applied on upper surface (e.g., forming surface 144) of the base 104, which contacts the undersurface of the composite structure 200. In this way pressure applied to an outer surface (e.g., composite surface 206) of the composite structure 200 acts cooperatively with the base 104 to generate compressive force upon the composite structure 200.

As illustrated in FIGS. 3-9, in one or more examples, the base 104 has an appropriate shape that defines or corresponds to the desired cross-sectional shape 204 of the composite structure 200. In one or more examples, the base 104 includes the rigid form 142. In one or more examples, the rigid form 142 includes the forming surface 144. In one or more examples, the forming surface 144 corresponds to a cross-sectional shape 204 of the composite structure 200. As illustrated in FIG. 3, in one or more examples, the rigid form 142 has a suitable upper forming surface 144 upon which the three-dimensional shape of the composite structure 200 can be formed and/or supported. As illustrated in FIG. 9, in one or more examples, the rigid form 142 has a planar or flat forming surface 144 upon which the two-dimensional shape of the composite structure 200 can be formed and/or supported.

In one or more examples, the base 104 is a forming tool used during layup and formation of the composite structure 200. In one or more examples, the base 104 is a cure tool used during a curing process, such as an initial cure in an autoclave. In one or more examples, the base 104 is a repair tool used during a localized curing process, such as second out-of-autoclave cure or repair process.

Figures 4, 5, 6:
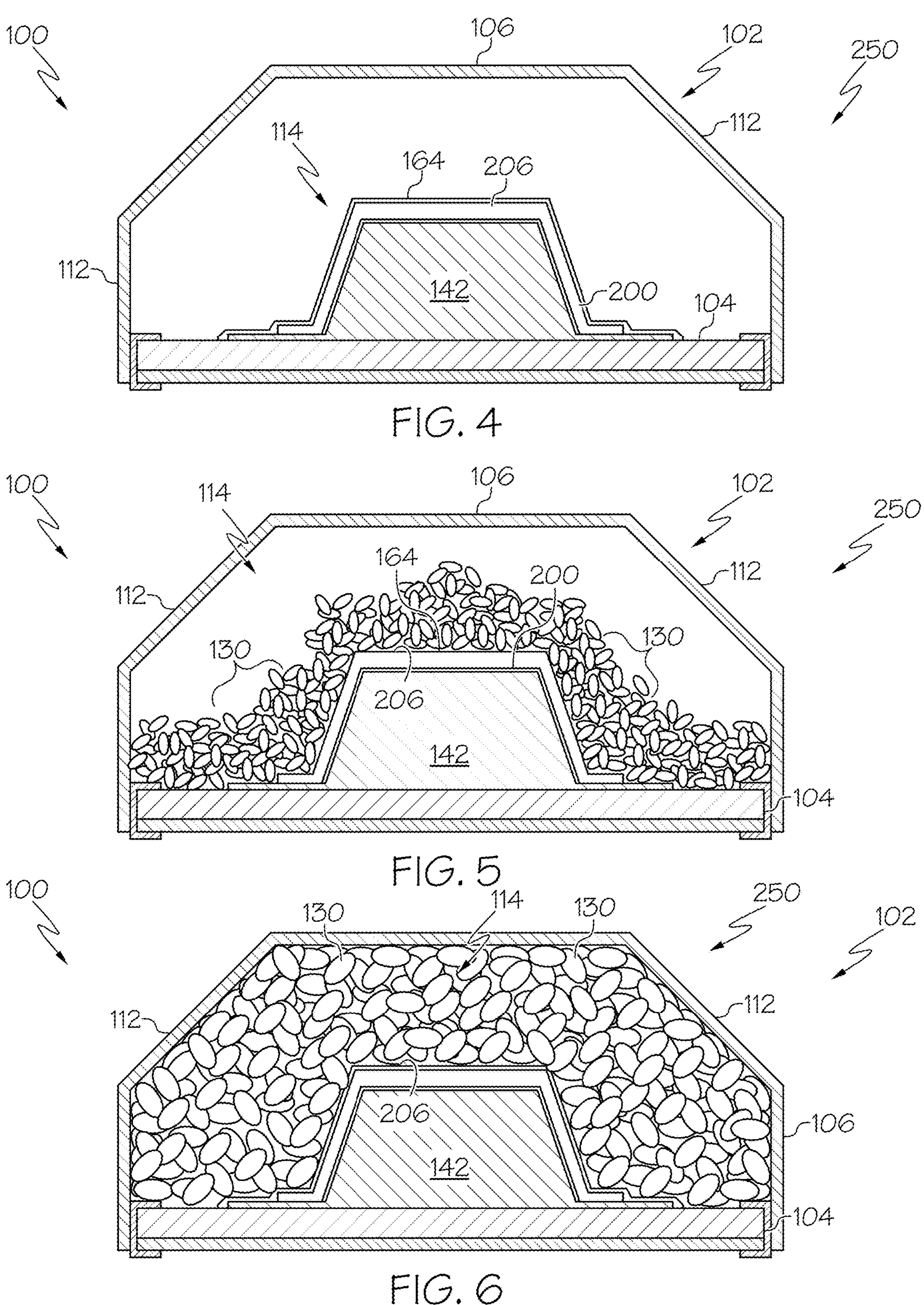
FIG. 4 is a schematic, sectional view of an example of a constraining container of the system applied to a composite structure.
FIG. 5 is a schematic, sectional view of an example of the system shown in FIG. 5 with an expandable medium disposed within an interior volume of the constraining container.
FIG. 6 is a schematic, sectional view of an example of the system shown in FIG. 6 after expansion of the expandable medium.

Referring to FIGS. 1, 3 and 9, in one or more examples, the retainer 120 is configured to be coupled to the base 104. In one or more examples, the retainer 120 is configured to couple the cover 106 and the base 104 together. In these examples, the cover 106 and the base 104, in combination, form the constraining container 102 within which the portion 202 of the composite structure 200 and the expandable medium 130 are contained during the local curing process (e.g., as shown in FIGS. 6-8).

In one or more examples, the retainer 120 is configured to be coupled to the rigid form 142. In one or more examples, the retainer 120 is configured to couple the cover 106 and the rigid form 142 together.

In one or more examples, a portion of the perimeter edge 116 of the cover 106 is configured to contact the base 104, which is supporting the composite structure 200.

Referring to FIGS. 1, 4, 5 and 10, in one or more examples, the intermediate layer 164 is disposed or situated between the expandable medium 130 and at least the portion 202 of the composite structure 200. In one or more examples, the intermediate layer 164 includes or takes the form of the barrier 162 (e.g., a barrier film), the caul 146 (e.g., a caul plate or caul sheet), or other suitable material layer (e.g., casting 156, bladder 178, etc.). In these examples, the intermediate layer 164 is positioned before adding the expandable medium 130 to the interior volume 114 of the constraining container 102.

In one or more examples, the barrier 162 facilitates reduced porosity and/or an improved consolidation. The barrier 162 can be selected to be resistant to heat and to be readily removable after the composite structure 200 is cured. Examples of materials for the barrier 162 include silicon-based films, polymer-based films, and/or fluorinated polymer-based films, and the like. In one or more examples, the barrier 162 is incorporated into a vacuum bag that contains the composite structure 200.

In one or more examples, the caul 146 facilitates improved consolidation and improved surface conditions of the composite structure 200. The caul 146 can be selected to be resistant to heat and to be readily removable after the composite structure 200 is cured. Examples of materials for the caul 146 include a rigid or semi-rigid material, a metallic material, a composite material, and the like.

Figure 10:
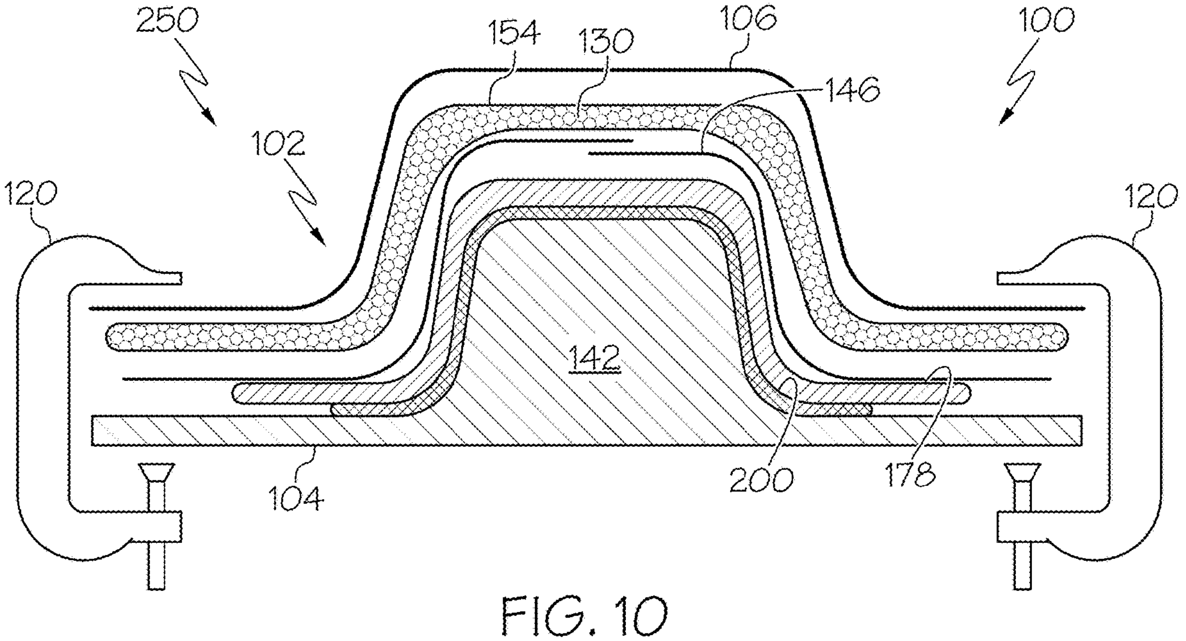
FIG. 10 is a schematic, sectional view of an example of the system.

In one or more examples, as illustrated in FIG. 10, the caul 146 includes or is formed by a plurality of caul sections. In these examples, each one of the caul sections is separate from another one and is movable (e.g., capable of shifting or sliding) relative to an adjacent one of the caul sections. In one or more examples, the ends of adjacent ones of the caul sections overlap. The separate caul sections of the caul 146 facilitate improved consolidation and surface condition.

In one or more examples, the intermediate layer 164 includes or takes the form of the casting 156. In one or more examples, the casting 156 is disposed between the expandable medium 130 and the composite surface 206 of the composite structure 200. In these examples, the casting 156 is configured to harden in response to a change in temperature, time, or some other attribute of the material of the casting 156. As an example, the casting 156 is applied or formed over the portion 202 of the composite structure 200 before adding the expandable medium 130. In one or more examples, the casting 156 is configured to harden before or during the curing process. The casting 156 can be selected to be resistant to heat and to be readily removable after the composite structure 200 is cured. In one or more examples, the casting 156 facilitates improved consolidation. The casting 156 can be selected to be resistant to heat and to be readily removable after the composite structure 200 is cured. Examples of materials for the casting 156 epoxy, rubber, plaster, cement, and the like.

In one or more examples, the casting 156 includes a casting material. In one or more examples, the casting material is configured to harden when a predetermined change is produced in an attribute of the casting material. As examples, the casting material can harden in response to a change in temperature, in time, in chemical composition, in pressure, or some other attribute of the material of the casting 156. In one or more examples, the casting material is thermally activated. In these examples, the predetermined change in the attribute of the casting material includes a change in the temperature of the casting material and/or the temperature of one or more portions of the casting material. Accordingly, producing the predetermined change in the attribute of casting material can include raising the temperature of the casting 156 from a lower temperature, such as an ambient temperature (e.g., room temperature), to at least a predetermined temperature greater than the initial or ambient temperature (e.g., the predetermined temperature is a number of degrees above the ambient temperature suitable to produce a predetermined expansion of the expandable element). The casting material then undergoes hardening or curing as a result of the increase in temperature. In these examples, the thermally activated casting material is configured to harden when the temperature of the casting material is raised to at least a predetermined temperature. In one or more examples, the predetermined change produced in the attribute of the casting material is a combination of two or more properties of the casting material, such as a ratio or a product of quantitative values associated with properties of the casting material. In one or more examples, the casting material includes two materials, (e.g., a two-part mixture), such as a base and a hardener (e.g., reactant, catalyst, or accelerator) that harden or cure when mixed due to a chemical reaction. In one or more examples, the casting material includes a resin-based composite that hardens or cures in response to exposure from light at certain wavelengths (e.g., blue light in the 400□500 nm range). In one or more examples, multiple hardening techniques can be combined to harden or accelerate the hardening of the casting 156, such as heat and two-part mixing, heat and ultraviolet (UV) cure, and the like or other combinations. If heat is required to harden the casting 156 or accelerate the hardening, such elevated temperature is generally at most the composite curing temperature.

In one or more examples, the casting material is thermally reflective or includes a thermally reflective material, liner, or layer. As an example, the casting 156 can include at least one thermally reflective film as one of the layers in the cast. The thermally reflective film can be an innermost layer, a middle or interior layer, and/or an outermost layer of the cast. Thermal reflectivity of the casting 156 facilitates improved heating of the expandable medium 130 to activate expansion of the expandable medium 130 during the curing process.

In one or more examples, the intermediate layer 164 includes or takes the form of the bladder 178. In one or more examples, the bladder 178 is filled with a fluid (e.g., gas or liquid) and facilitates improved consolidation and improved surface conditions of the composite structure 200. In one or more examples, the bladder 178 is configured to equalize the positive pressure applied to the composite structure 200 such that the positive pressure is more uniformly applied across the composite surface 206. The bladder 178 can be selected to be resistant to heat and to be readily removable after the composite structure 200 is cured.

In other examples, the system 100 includes a plurality of the intermediate layers 164, such as more than one of or a combination of the encapsulating element 154, the caul 146, the casting 156, the barrier 162, and the like.

Referring to FIG. 1, in one or more examples, the expandable medium 130 is configured to expand to a predetermined volume 132 when a predetermined change is produced in an attribute 134 of the expandable medium 130 such that the expandable medium 130 applies or exerts positive pressure upon the composite structure 200 and the walls 112 of the cover 106. In one or more examples, the volume 132 of the expandable medium 130 in the expanded state is greater than the interior volume 114 of the constraining container 102. Generally, the "predetermined volume" refers to the actual available, fillable interior volume of the interior cavity of the constraining container 102 (e.g., the interior volume 114). In various examples, the predetermined volume 132 substantially the same as or marginally greater than the interior volume 114 such that, upon expansion of the expandable medium 130 to the predetermined volume 132, the expandable medium 130 applies the positive pressure to the composite structure 200, unless the interior volume 114 can be changed (e.g., by using movable walls 112, controllably expandable elements 196, and the like). Generally, the amount (e.g., volume) of the expandable medium 130 in the unexpanded state to be loaded within the interior volume 114 of the constraining container 102 is established by testing or models to predict the pressure during and after expansion within in the constrained volume.

Referring to FIGS. 1 and 5-8, in one or more examples, the expandable medium 130 includes expandable pellets 136. In one or more examples, the expandable pellets 136 are thermally activated at an activation temperature 152. In these examples, the expandable pellets 136 are configured to expand when the temperature of the expandable pellets 136 is raised up to the activation temperature 152.

In one or more examples, any suitable number of the expandable pellets 136 can be placed within the interior volume 114 of the constraining container 102, provided that when expanded they are able to apply the positive pressure to the composite surface 206 of the composite structure 200 sufficient to consolidate and shape the composite structure 200 during curing. The number of the expandable pellets 136 is dependent upon the size of the interior volume 114. That is, where the constraining container 102 fits more closely around the contours of the composite structure 200, the fewer number of the expandable pellets 136 may be needed. In various examples, each expandable pellet 136 can have any suitable dimensions. In one or more examples, the length of the expandable pellets 136 is less than approximately one centimeter. The expandable pellets 136 can be substantially uniform in size or can include pellets of different sizes.

In one or more examples, the activation temperature 152 of the expandable pellets 136 is less than, at least, or greater than a curing temperature 212 of the composite structure 200. In one or more examples, the activation temperature 152 of the expandable pellets 136 is less than, at least, or greater than the curing temperature 212 of at least a portion of the plurality of composite layers 208 forming the composite structure 200.

Referring to FIG. 1, in one or more examples, the expandable pellets 136 include foamable pellets 138. In one or more examples, the foamable pellets 138 are configured to foam when heated to at least a predetermined foaming temperature. In one or more examples, the foamable pellets 138 include a foamable material, such as a thermoplastic material treated with a blowing agent; a gas-filled balloon; hollow microspheres, a metal; any other suitable component configured to expand when heated, or any combination thereof.

Referring to FIG. 1, in one or more examples, the expandable medium 130 includes the encapsulating element 154. In these examples, the expandable pellets 136 are disposed in the encapsulating element 154. In these examples, the encapsulating element 154 encloses the expandable medium 130 (e.g., the expandable pellets 136), thereby better facilitating handling of the expandable medium 130 as well as the removal of the expandable medium 130 after curing is complete. In one or more examples, the encapsulating element 154 is non-expandable. In one or more examples, the encapsulating element 154 is expandable.

Referring to FIGS. 1 and 10, in one or more examples, the expandable medium 130 is disposed within the encapsulating element 154. In these examples, the encapsulating element 154 encloses the expandable medium 130 (e.g., expandable pellets 136), thereby better facilitating handling of the expandable medium 130 as well as the removal of the expandable medium 130 after curing is complete. In one or more examples, the encapsulating element 154 is non-expandable. In one or more examples, the encapsulating element 154 is expandable. The encapsulating element 154 can take any suitable form, such as an enclosed film, sealed material layer, bag, bladder, and the like.

In one or more examples, the heater 158 is in thermal communication with the expandable medium 130. The heater 158 is configured to heat the expandable medium 130 to the activation temperature 152 in which the expandable medium 130 expands within the interior volume 114 to apply positive pressure to the composite structure 200. In one or more examples, the heater 158 is an internal heater and is configured to be disposed within the interior volume 114 of the constraining container 102 with the expandable medium 130. In one or more examples, the heater 158 is an external heater and is configured to be disposed outside of the constraining container 102. The heater 158 can take any suitable form or include any suitable heating device. In various examples in which the expandable medium 130 is thermally activated to expand, the constraining container 102, such as at least the cover 106, can be heated externally. Alternatively, or in addition, the system 100 can include one or more heat-generating substances configured to heat the expandable medium 130 to a predetermined temperature at which the expandable medium 130 will expand.

In the various illustrative examples, the constraining container 102 includes multiple components, including the base 104 and the cover 106. In one or more examples, at least a portion (e.g., portion 202) of the composite structure 200 is disposed upon or is supported by the base 104 or other rigid support reinforcement. In other examples, the composite structure 200 is supported by some other type of structure, such as another underlying component of the composite structure 200. The cover 106 is selectively located relative to the composite structure 200 to enclose the portion 202 to be cured. The cover 106 is applied to or is placed over the composite structure 200 such that the portion 202 of the composite structure 200 is within an interior volume 114 of the constraining container 102. The expandable medium 130 is disposed (e.g., added to or located within) the interior volume 114 of the constraining container 102 such that the expandable medium 130 is at least proximate to the portion 202 (e.g., an uncured portion, partially cured portion, repair portion) of the composite structure 200 and on an opposing side from the base 104 or other supporting reinforcement.

Prior to the curing process, the expandable medium 130 is in an unexpanded state (e.g., FIGS. 5 and 7). In the unexpanded state, the expandable medium 130 may be referred to as unexpanded or as an unexpanded element. During the curing process, the expandable medium 130 is caused to expand to an expanded state (e.g., FIGS. 6 and 8). In the expanded state, the expandable medium 130 may be referred to as expanded or as an expanded element. In the expanded state, the expandable medium 130 applies pressure to the interior surfaces of the constraining container 102 (e.g., of the cover 106) and to the surface of the portion 202 of the composite structure 200 (e.g., uncured composite workpiece). The expanded expandable medium 130 applies the positive pressure (resulting from the expansion of the expandable medium 130) to the composite structure 200 during some or all of the curing process to facilitate consolidation. After the composite structure 200 has been cured, the expandable medium 130 can be removed from the constraining container 102 prior to, simultaneously with, or after the cured composite structure 200 is removed from the constraining container 102.

For the purpose of the present disclosure, the term "expandable," "expand," "expanding," and similar terms refer to an ability to be expanded or having the potential or capability of increasing in size and/or volume. A substance or discrete element that is expandable may be capable of increasing in size or volume symmetrically or asymmetrically. Where the expandable substance is capable of symmetric expansion, the substance undergoes an a substantially equivalent degree of expansion along each axis. Where the expandable substance exhibits asymmetric expansion, the substance can undergo a greater relative expansion along a first axis, or first and second axes, than along a different axis.

In various examples, use of the constraining container 102 for applying pressure to the uncured composite workpiece permits composite manufacturing to occur without the necessity of employing an industrial autoclave. By employing the constraining container 102 that is substantially smaller than the entirety of the composite structure 200 (e.g., uncured or partially cured composite structure), the footprint required for curing can be significantly reduced, the amount of expandable medium 130 can be minimized, and discrete portions of the composite structure 200 can be locally cured out of autoclave.

In various examples, the expandable medium 130 is configured to expand when a predetermined change is produced in the expandable medium 130. The predetermined change is typically a change in a physical property or chemical property or a combination thereof, and/or any other suitable property of the expandable medium 130 that is associated with expansion of the expandable medium 130. Unless otherwise specified, expansion of the expandable medium 130 refers to an increase in the volume of the expandable medium 130, surface area of the expandable medium 130, and/or spatial extent of the expandable medium 130 in one or more dimensions. As an example, the expandable medium 130 can be configured to expand when the temperature of the expandable medium 130 is raised from a lower temperature, such as an ambient temperature, to a predetermined higher temperature. Accordingly, in cases in which curing the composite structure 200 includes raising the temperature of the composite structure 200, the expandable medium 130 expands inside the interior volume 114 during the curing process. The expandable medium 130 (e.g., while expanding or after expanded) exerts pressure against the interior of the constraining container 102 as well as the uncured portion of the composite structure 200 during the curing process.

In various examples, the expandable medium 130 is selected so that upon expansion within the interior volume 114 of the constraining container 102, the expandable medium 130 exerts sufficient pressure to effectively consolidate a composite material as it cures. For some composite materials, an applied pressure of less than 1 atmosphere can be sufficient for consolidation and curing, while other composite materials can be more effectively cured at an applied pressure of 1 atmosphere or greater. The expandable medium 130 can be selected to exert sufficient pressure that pressures can be applied that have typically previously required an autoclave (e.g., 1-5 atmospheres).

In various examples, the curing process is simplified and facilitated by adding the expandable medium 130 as a plurality of the expandable pellets 136 (also called expandable beads). In these examples, the expandable pellets 136 are configured to undergo volumetric expansion when heated to at least the predetermined temperature. In one or more examples, the expandable medium 130 includes one or more different types of the expandable pellets 136, each configured to expand (e.g., to a predetermined volume) when heated to a predetermined temperature. As an example, the composition of the expandable pellets 136 can be designed to achieve a desired relationship between the volume of each of the expandable pellets 136 and the temperature of the expandable pellet 136 as a function of time.

In various examples, the extent of the expansion of a given type or composition of the expandable medium 130 (e.g., expandable pellet 136) can be measured and recorded, as can the forces generated by the expansion. The formulation of the composition can therefore be varied in order to obtain a desired degree of expansion and expansion force. In this way, the number and composition of expandable pellets 136 employed can be selected such that the expansion of the plurality of expandable pellets 136 within the known volume will apply a desired pressure upon the uncured composite workpiece at one or more stages of the curing process. After the composite workpiece has been cured, the expanded pellets 136 can be easily removed from the constraining container 102.

In one or more examples, the system 100 includes additional elements configured to modify or moderate the pressure applied by the expandable medium 130, such as, but not limited to, one or more volumetrically invariant elements 172 (e.g., substantially noncompressible elements), and/or one or more contractible elements 174 (e.g., a fluid-filled bladder), which can be reduced in volume after curing to facilitate access to the composite structure 200.

In one or more examples, the system 100 can also include one or more expandable elements 196 (FIG. 1). In these examples, the expandable element 196 is situated within the interior volume 114 of the constraining container 102. In one or more examples, the expandable element 196 is configured to be selectively expanded and contracted to selectively decrease or increase the interior volume 114 of the constraining container 102 available to be filled by the expandable medium 130 during expansion. In one or more examples, the expandable element 196 includes or takes the form of an enclosed bladder or balloon with some type of expandable medium (e.g., expandable medium 130). As an example, a chemical (e.g., baking soda powder) can be disposed within a balloon. After heating the chemical and generating a gas, the balloon will expand and decrease the fillable volume of the interior volume 114 of the constraining container 102 and/or apply positive pressure in the constrained space. In other examples, the expandable element 196 is an example of the expandable medium 130.

FIGS. 4-8 illustrate examples of a workpiece assembly 250, including a composite workpiece 210, such as the composite structure 200, and the constraining container 102. The composite structure 200 is disposed within the constraining container 102. The constraining container 102 is configured to enclose the portion 202 of the composite structure 200. In an example, the portion 202 of the composite structure 200 is covered or otherwise enclosed by the cover 106. The cover 106 is constructed to facilitate the application of pressure upon the composite surface 206 of the composite structure 200 by the expansion of the expandable medium 130. In one or more examples, the composite structure 200 is disposed on the base 104 or is otherwise supported from a position opposite the cover 106 and the direction of the positive pressure by a reinforcement as needed. As illustrated in FIGS. 4-6, in one or more examples, the walls 112 of the cover 106 define the interior volume 114 within the constraining container 102. As illustrated in FIGS. 7 and 8, in one or more examples, the overlay 168 of the cover 106 defines the interior volume 114 within the constraining container 102.

As illustrated in FIGS. 5 and 7, the expandable medium 130 is added to the interior volume 114. A suitable amount of the expandable medium 130 is used such that, during and/or after expansion, the expandable medium 130 contacts both the composite structure 200 and inner surfaces of the cover 106 to generate and apply the positive pressure upon the composite surface 206 of the composite structure 200.

The expandable medium 130 can take any suitable form. In one or more examples, the expandable medium 130 is added to within the constraining container 102, for example, as pellets, beads, grains, powder, or foam. Alternatively, or in addition, the expandable medium 130 is added to the constraining container 102 as discrete portions of a solid or semi-solid, such as layers of the expandable medium 130 that can be draped across the portion 202 of the composite structure 200. Layers of the expandable medium 130 can be added by adding individual encapsulating elements 154 (e.g., sacks or bags) filled with pellets, beads, or other smaller portions of the expandable medium 130. Although FIGS. 6 and 7 depict the expandable medium 130 as a plurality of the expandable pellets 136, this is a representative depiction and should not be considered to limit the structure or configuration of the expandable medium 130.

In various examples, the expandable medium 130 is added to the interior volume 114 of the constraining container 102 while in the unexpanded state. As illustrated in FIGS. 6 and 8, prior to and/or during the curing process, the expandable medium 130 is made to expand (e.g., to increase in volume) to at least partially fill the interior volume 114, such that the expandable medium 130 (in the expanded state) applies positive pressure directly or indirectly to at least some inner surfaces of the cover 106 as well as the composite surface 206 (e.g., upper and/or outer surface) of the composite structure 200. The pressure exerted by the expandable medium 130 as it expands thereby helps to compress and consolidate the portion 202 of the composite structure 200 as it is cured.

In various examples, the expandable medium 130 is configured to expand (e.g., to a predetermined volume and/or pressure) when a predetermined change is produced in an attribute 134 of the expandable medium 130 (e.g., in the unexpanded state). In one or more examples, the expandable medium 130 is applied (e.g., inserted or added) within the interior volume 114 of the constraining container 102 in the unexpanded state. The predetermined change is produced in the attribute 134 of the unexpanded expandable medium 130 while the unexpanded expandable medium 130 is within the interior volume 114. The expandable medium 130 expands in response to the produced predetermined change. The attribute 134 of the expandable medium 130 can be a physical and/or chemical attribute.

In one or more examples, the expandable medium 130 is configured to expand in volume when it interacts with water. As an example, the expandable medium 130 is or includes a desiccant, the desiccant can increase in volume as water is absorbed. For example, anhydrous calcium sulfate (anhydrite) exhibits an increase in volume of approximately sixty one percent (61%) when it absorbs water to form gypsum. In these examples, water can be added to the expandable medium 130 directly, such as by adding liquid water or water vapor to the interior of the constraining container 102. Alternatively, or in addition, water or water vapor can be generated within the constraining container 102 itself, for example by an appropriate chemical reaction.

In one or more examples, the predetermined change in the attribute 134 of the expandable medium 130 includes a change in the temperature of expandable medium 130 and/or the temperature of one or more portions of the expandable medium 130. Accordingly, producing the predetermined change in the attribute of expandable medium 130 can include raising the temperature of the unexpanded expandable element from a lower temperature, such as an ambient temperature (e.g., room temperature), to at least a predetermined temperature greater than the initial or ambient temperature (e.g., the predetermined temperature is a number of degrees above the ambient temperature suitable to produce a predetermined expansion of the expandable element). The expandable element then undergoes thermal expansion as a result of the increase in temperature.

In one or more examples, the expandable medium 130 is a thermally activated expandable element. In these examples, the thermally activated expandable element is configured to expand when the temperature of the expandable medium 130 is raised to at least a predetermined temperature. Alternatively, or in addition, expanding the expandable medium 130 by heating the expandable medium 130 to at least a predetermined temperature produces a predetermined pressure against the composite structure 200. Typically, the predetermined pressure is a pressure sufficient to adequately cure the composite material.

In one or more examples, the predetermined change produced in the attribute 134 of the expandable medium 130 is a combination of two or more properties of the expandable medium 130, such as a ratio or a product of quantitative values associated with properties of the expandable medium 130, such as two materials that have different coefficients of thermal expansion.

In various examples, the process of curing the composite structure 200 includes producing the predetermined change in the attribute 134 of the expandable medium 130. In one or more examples, expansion of the expandable medium 130 occurs automatically during the curing process. For example, the attribute 134 can be a temperature of the expandable medium 130, and heat that is applied to workpiece assembly 250 during the curing process can produce the predetermined change in the temperature of the expandable medium 130. That is, heat applied to the workpiece assembly 250 during the curing process can raise the temperature of the expandable medium 130 to at least a predetermined temperature associated with a desired volume and/or desired increase in volume. One or more properties of the expandable medium 130 can be designed such that the temperature change induced in the expandable medium 130 during curing of the composite structure 200 causes the expandable medium 130 to expand a desired predetermined amount as a result of thermal expansion. Alternatively, or additionally, causing the expandable medium 130 to expand can require additional steps beyond those required to cure the composite structure 200. As an example, causing the expandable medium 130 to expand can include applying an electric field, injecting a liquid, gas, and/or another suitable material, and/or inducing any other suitable change in the expandable medium 130.

In various examples, the expandable medium 130 is thermally expandable and includes any material capable of undergoing expansion when the predetermined temperature is reached. In a particular example, a family of plastic polymers capable of softening when heated are called thermoplastic materials. When heated above its glass transition temperature and below its melting point, a solid thermoplastic material softens, becoming a viscous liquid. In this state, thermoplastics can be reshaped, and more specifically, can be expanded.

A variety of classes of thermoplastic materials are known, including acrylic polymers, acrylonitrile butadiene styrene (ABS) polymers, nylon polymers, polylactic acid (PLA) polymers, polybenzimidazole polymers, polycarbonate polymers, polyether sulfone (PES) polymers, polyetherimide (PEI) polymers, polyethylene (PE) polymers, polyphenylene oxide (PPO) polymers, polyphenylene sulfide (PPS) polymers, polyvinyl chloride (PVC) polymers, polyvinylidene fluoride (PVDF) polymers, and polytetrafluoroethylene (PTFE) polymers, among others. In particular, the expandable medium 130 that includes acrylonitrile butadiene styrene (ABS) polymers can exhibit favorable physical properties when used in conjunction with the examples described herein.

In one or more examples, the expandable medium 130 (e.g., the expandable pellets 136) can additionally include a blowing agent. The blowing agent is selected so that, when heated to at least a predetermined temperature, it forms a plurality of holes, pockets, or voids within the material of the expandable medium 130, such that the volume of the expandable medium 130 increases. As an example, an appropriate blowing agent can be an inert gas that is permeated into the expandable medium 130 under pressure. Such a blowing agent can be configured to expand in a plurality of locations within the expandable medium 130 when the temperature of the expandable medium 130 is increased from an ambient or initial temperature to a predetermined higher temperature, and the expanded gas forms holes, pockets, or voids within the pellet. A blowing agent, if present, can be applied to the expandable medium 130 prior to heating.

In examples in which the expandable medium 130 includes a blowing agent, the blowing agent can be any appropriate substance capable of producing the desired degree of expansion. The blowing agent may include a physical blowing agent such as a chlorofluorocarbon, a hydrochlorofluorocarbon, a hydrocarbon, or liquid CO2, among others. Alternatively, or in addition, the blowing agent may include a chemical blowing agent selected to react with one or more components of the expandable medium 130, such as isocyanate and water for polyurethane, azodicarbonamide for vinyl, hydrazine and other nitrogen-based materials for thermoplastic and elastomeric foams, and sodium bicarbonate for thermoplastic foams, among others.

In examples in which the expandable medium 130 includes a blowing agent, the blowing agent can include a foaming agent. In these examples, the blowing agent can be selected to form a gas, the foaming agent can be a material that facilitates formation of a foam, such as for example, a surfactant. Suitable foaming agents can include sodium laureth sulfate, sodium lauryl ether sulfate (SLES), sodium lauryl sulfate (also known as sodium dodecyl sulfate or SDS), and ammonium lauryl sulfate (ALS), among others.

During the process of curing the composite structure 200, the expandable medium 130 (e.g., expandable pellets 136) are made to expand from the unexpanded state (FIGS. 5 and 7) to the expanded state (FIGS. 6 and 8). In one or more examples, the expandable pellets 136 are configured to expand in response to heat applied to the workpiece assembly 250 during curing. The expandable pellets 136 expand to fill the interior volume 114 of the cover 106, such that the expanded expandable pellets 136 apply positive pressure to composite structure 200 and the composite structure 200 is cured.

In one or more examples, the expandable medium 130 (e.g., the expandable pellets 136) are configured (e.g., formulated) so that it is at least partially deformable after, during, and/or before expansion. A degree of deformability allows the expandable medium 130 to squeeze into small gaps that might otherwise exist, for example, between pellets, between pellets and inner surfaces of the cover 106, and/or between pellets and the composite surface 206 of the composite structure 200. Filling such gaps allows the expandable medium 130 to present a substantially smooth surface to the composite structure 200.

In various examples, after the portion 202 of the composite structure 200 has been cured, the cover 106 can be unsealed, opened, or removed, as needed, and the expandable medium 130 can be removed. Although the expandable medium 130 is typically readily removable after the composite structure 200 has been cured, in some instances, the expandable medium 130 may remain expanded and tightly packed after the composite structure 200 has been cured and cooled, which may tend to impede removal. In such cases, the expandable medium 130 can be additionally configured in one or more ways to be more easily separated from the composite structure 200, the base 104, and/or the cover 106. As an example, the expandable pellets 136 can be configured so that their shape and/or size can be changed when desired, such that that they can be more readily extracted. For example, the expandable pellets 136 can be configured to shrink when cooled, so that after the composite structure 200 is cured and cooled, the expandable pellets 136 shrink in the interior volume 114, thereby facilitating their removal.

In one or more examples, the expandable medium 130 is modified to minimize sintering (self-adhesion) upon heating and expansion. Alternatively, or in addition, the expandable medium 130 is configured to minimize potential adhesion with surfaces, such as by coating the expandable pellets 136 with a suitable agent configured to prevent adhesion and/or to facilitate separation.

In one or more examples, a suitable agent for adding to the expandable medium 130 includes a lubricating agent. As an example, a lubricating agent can be added to the expandable pellets 136 to decrease adhesion between the expandable pellets 136 before and/or after volumetric expansion. A suitable lubricating agent is one that does not interfere with curing of the composite structure 200 and prevents the expanded pellets 136 from substantially adhering to one another, to the constraining container 102, or to the components of the workpiece assembly 250. Suitable lubricating agents can include liquids, powders, or combinations thereof. When added as a powder, a suitable lubricating agent can include a nano-powder. Alternatively, or in addition, suitable lubricating agents can include silicon-based materials, fluorinated polymers, or other substantially inert substances. For example, a suitable lubricating agent can include polytetrafluoroethylene (PTFE) powder, PTFE nano-powder, silicone, perfluoropolyether (PFPE), perfluoroalkylether (PFAE), perfluoropolyalkylether (PFPAE), and/or the like. Such a lubricant can be applied to the expandable pellets 136 before the expandable pellets 136 are added into the constraining container 102. Alternatively, or additionally, a suitable lubricant can be applied to the expandable pellets 136 while they are disposed inside the constraining container 102. Coating at least some of the expandable pellets 136 with a suitable lubricant can include mixing the lubricant with the plurality of pellets and/or pouring the lubricant over the plurality of pellets. Additionally, or alternatively, at least a subset of the plurality of expandable pellets 136 can be coated with a desired lubricant and then mixed in with a plurality of uncoated pellets.

In one or more examples, crystallinity and/or semi-crystallinity along the outer surfaces of the expandable pellets 136 can help to prevent the pellets from sintering to each other. In one or more examples, at least some of the expandable pellets 136 are configured, such as by preprocessing, to have regions of crystallinity along outer surfaces of the pellets, such that adding the expandable medium 130 includes adding a plurality of the expandable pellets 136 having surface regions of increased crystallinity in order to decrease adhesion between pellets before and/or after volumetric expansion of the expandable pellets 136. In one or more examples, the expandable pellets 136 can be employed where outer surfaces of the pellets exhibit a high degree of crystallinity (e.g., a high percentage of the volume of regions of each pellet near the outer surface is crystalline). The crystallinity can be induced in the expandable pellets 136 by controlling one or more factors including the material composition of the pellets, the production temperatures to which the pellets are heated during production, the times for which the pellet temperatures are maintained at the production temperatures during production, electric and/or magnetic fields applied during production, distribution of a blowing agent in the pellets, composition and/or concentration of blowing agent, and so on. The outer surfaces of the expandable pellets 136 can be crystalline before foaming, during foaming, and/or after foaming.

Figure 2:
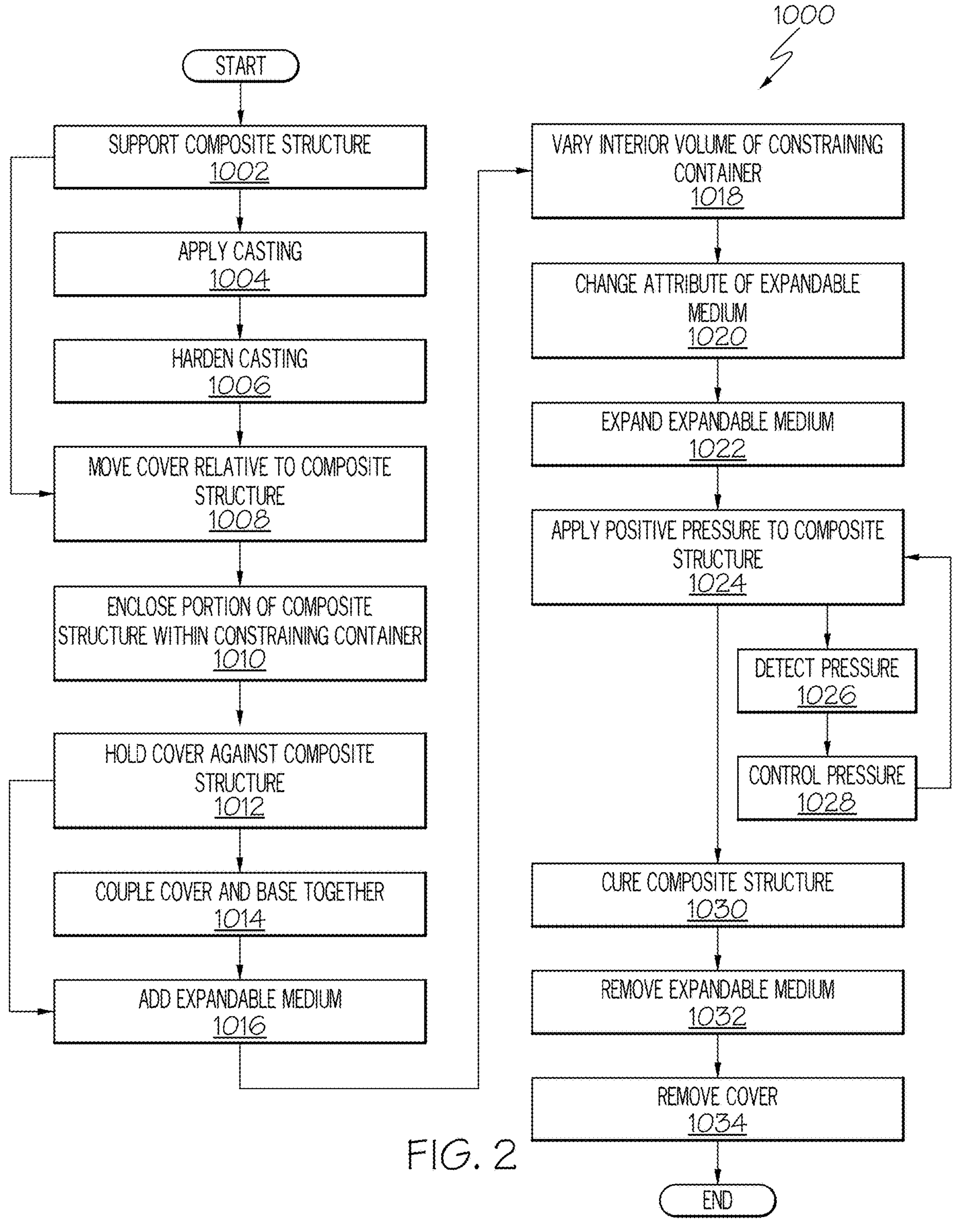
FIG. 2 is a flow diagram of an example of a method for locally curing a composite structure.

Referring now to FIG. 2, the following are examples of the method 1000, according to the present disclosure. The method 1000 includes a number of elements, steps, operations, or processes. Not all of the elements, steps, operations, or processes described or illustrated in one example are required in that example. Some or all of the elements, steps, operations, or processes described or illustrated in one example can be combined with other examples in various ways without the need to include other elements, steps, operations, or processes described in those other examples, even though such combination or combinations are not explicitly described or illustrated by example herein.

Referring generally to FIGS. 1 and 3-10 and particularly to FIG. 2, as will be described in more detail herein, in various examples, the method 1000 includes a number of steps. In one or more examples, the method 1000 is implemented using the system 100 (FIG. 1).

In one or more examples, according to the method 1000, the composite structure 200 includes a plurality of the composite layers 208. In one or more examples, at least a portion of the composite layers 208 is uncured. In one or more examples, at least a portion of the composite layers 208 is partially cured. In one or more examples, at least a portion of the composite layers 208 needs repair or takes the form of a repair patch (e.g., composite patch 214). In one or more examples, at least one of the composite layers 208 is the composite patch 214 that is configured to repair a portion of the composite surface 206 of the composite structure 200.

In one or more examples, the method 1000 includes a step of supporting 1002 at least the portion 202 of the composite structure 200. In one or more examples, the portion 202 of the composite structure 200 is supported by the base 104 such that the base 104 reinforces the composite structure 200 during the curing process.

In one or more examples, the method 1000 includes a step of applying 1004 the casting 156. In one or more examples, the casting 156 is applied or disposed between the expandable medium 130 and the composite surface 206 of the composite structure 200. The method 1000 includes a step of hardening 1006 the casting 156. In these examples, the casting 156 is disposed over the composite surface 206 of at least the portion 202 of the composite structure 200.

In one or mor examples, the method 1000 includes a step of moving 1008 the cover 106 relative to the composite structure 200. The cover 106 is moved to a suitable position to cover and enclose the portion 202 of the composite structure 200 to be locally cured using the system 100.

In one or more examples, the method 1000 includes a step of enclosing 1010 the portion 202 of the composite structure 200 within the constraining container 102. As an example, the cover 106 is positioned relative to the portion 202 of the composite structure 200 such that the portion 202 of the composite structure 200 is enclosed within the interior volume 114 of the constraining container 102 (e.g., cover 106).

In one or mor examples, the method 1000 includes a step of holding 1012 the cover 106 against the composite structure 200. In one or more examples, the cover 106 is held against the composite structure 200 using the retainer 120.

In one or more examples, the method 1000 includes a step of coupling 1014 the cover 106 to the base 104. In one or more examples, the cover 106 and the base 104 are coupled together using the retainer 120.

In one or more examples, the method 1000 includes a step of adding 1016 the expandable medium 130. In one or more examples, the expandable medium 130 is added within the interior volume 114 of the cover 106. In one or more examples, the step of adding 1016 is performed before the step of enclosing 1010. In one or more examples, the step of adding 1016 is performed after the step of enclosing 1010.

In one or more examples, the method 1000 included a step of selectively varying 1018 the interior volume 114 formed by the constraining container 102 and the composite structure 200. In one or more examples, the interior volume 114 is selectively modified by moving at least one of the walls 112 of the cover 106.

In one or more examples, the method 1000 includes a step of changing 1020 the attribute 134 of the expandable medium 130 to expand the expandable medium 130 to the predetermine volume 132.

In one or more examples, the method 1000, such as the step of changing 1020 the attribute 134 of the expandable medium 130 includes a step of increasing the temperature of the expandable medium 130 to at least the activation temperature 152.

In one or more examples, the method 1000 includes a step of expanding 1022 the expandable medium 130 disposed within the interior volume 114. In one or more examples, the interior volume 114 is formed by the walls 112 of the cover 106 and the composite structure 200. In one or more examples, the interior volume 114 is formed by the overlay 168 of the cover 106 and the composite structure 200.

In one or more examples, the method 1000 includes a step of applying 1024 positive pressure to the composite structure 200. Upon expansion, the expandable medium 130 fills the interior volume 114 and applies the positive pressure to the composite structure 200 and the cover 106.

In one or more examples, the method 1000 includes a step of detecting 1026 the pressure and/or force being applied to the composite structure 200 by expansion of the expandable medium 130. In one or more examples, the pressure and/or force is detected using the sensor 166. In one or more examples, the method 1000 includes a step of selectively controlling 1028 the pressure and/or force applied to the composite structure 200.

In one or more examples, the method 1000 includes a step of curing 1030 at least the portion 202 of the composite structure 200. The composite structure 200 is cured through the application of pressure from expansion of the expandable medium 130 within the interior volume 114. In one or more examples, the composite structure 200 is also cured through the application of heat.

In one or more examples, the method 1000 includes a step of removing 1032 the expandable medium 130. In one or more examples, the method 1000 includes a step of removing 1034 the cover 106 and other components of the constraining container 102.

Referring again to FIGS. 1 and 3-10, by way of examples, the present disclosure is also directed to the composite workpiece 210. Generally, the composite workpiece 210 includes the composite structure 200 as locally cured using the system 100 and/or according to the method 1000.

Referring to FIG. 1, the following are examples of the composite workpiece 210, according to the present disclosure. The composite workpiece 210 includes a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

In one or more examples, the composite workpiece 210 includes the composite structure 200 including a plurality of the composite layers 208. At least the portion 202 (e.g., at least one of the composite layers 208) is uncured or is partially cured. The portion 202 of the composite structure 200 is supported by the base 104 of the system 100. The portion 202 of the composite structure 200 is enclosed in the cover 106 of the system 100. The cover 106 forms or defines at least a portion of the interior volume 114 of the constraining container 102. In one or more examples, the cover 106 includes the walls 112 that form at least a portion of the interior volume 114. In one or more examples, the cover 106 includes the overlay 168 that forms at least a portion of the interior volume 114. The expandable medium 130 is disposed within the interior volume 114 of the constraining container 102 between the cover 106 and the composite structure 200. The expandable medium 130 is configured to expand to the predetermined volume 132 when a predetermined change is produced in the attribute 134 of the expandable medium 130 such that the expandable medium 130 applies positive pressure to the composite structure 200 and the cover 106.

In one or more examples of the composite workpiece 210, at least one of the composite layers 208 is the composite patch 214. The composite patch 214 is configured to repair a portion of the composite surface 206 of the composite structure 200 by locally curing the patch using the system 100.

In one or more examples of the composite workpiece 210, the expandable medium 130 includes the expandable pellets 136. The expandable pellets 136 are thermally activated at the activation temperature 152. The activation temperature 152 of the expandable pellets 136 is up to, at least, or greater than the curing temperature 212 of the plurality of composite layers 208.

In various other examples of the composite workpiece 210, the system 100 includes any one or more of the components described herein and/or illustrated in FIGS. 1 and 3-11.

Examples of the disclosed system 100 and method 1000 are useful for a variety of composite materials, used in manufacturing desired components for any suitable industrial application. Examples of the presently described system 100 and methods are particularly useful for out-of-autoclave manufacturing of composites, such as may be desirable in a manufacturing environment or a remote worksite. Examples of the presently described system 100 and method 1000 are additionally useful for the manufacture of components having a unique or awkward shape that may not readily be processed in an industrial autoclave.

Figure 11:
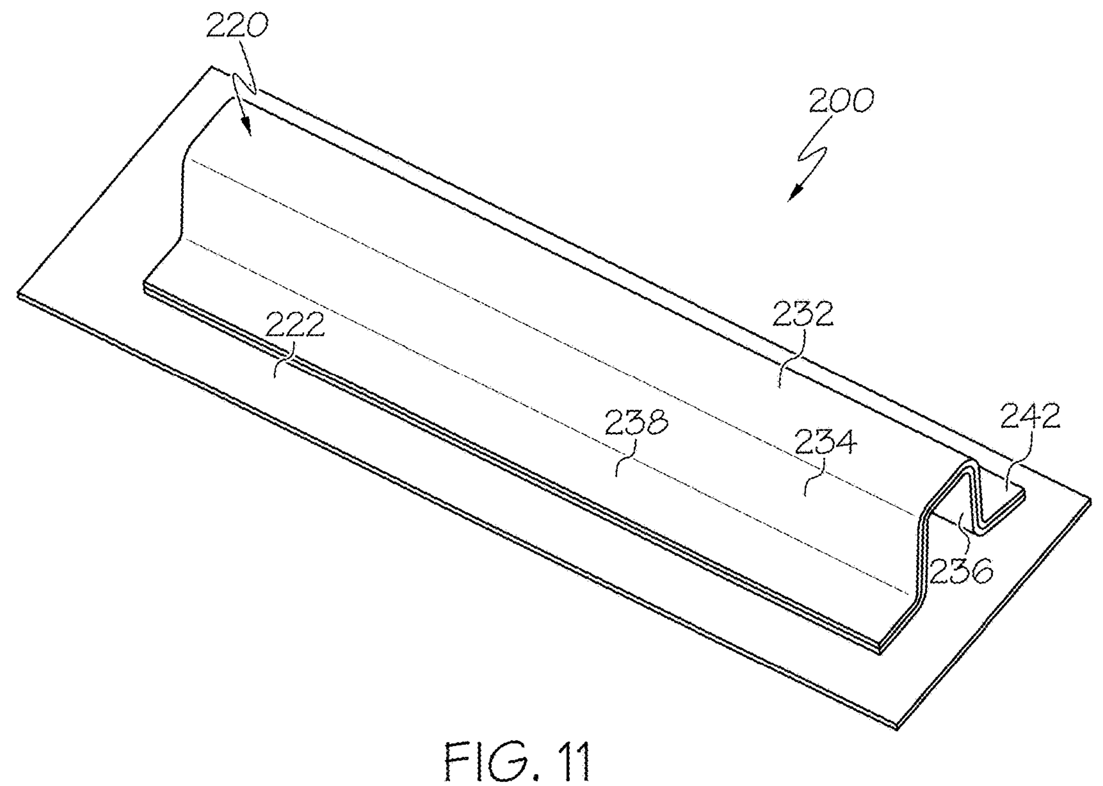
FIG. 11 is a schematic, perspective view of an example of an aircraft hat stiffener.
Figure 12:
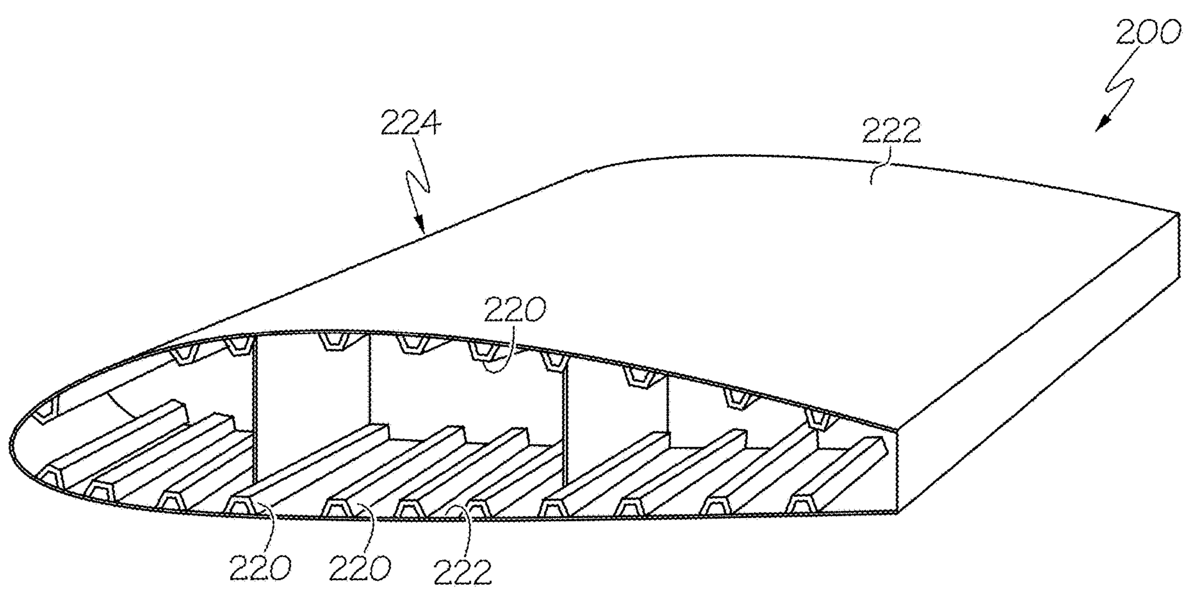
FIG. 12 is a schematic, perspective view of an example of an aircraft wing including stiffeners.
Figure 13:
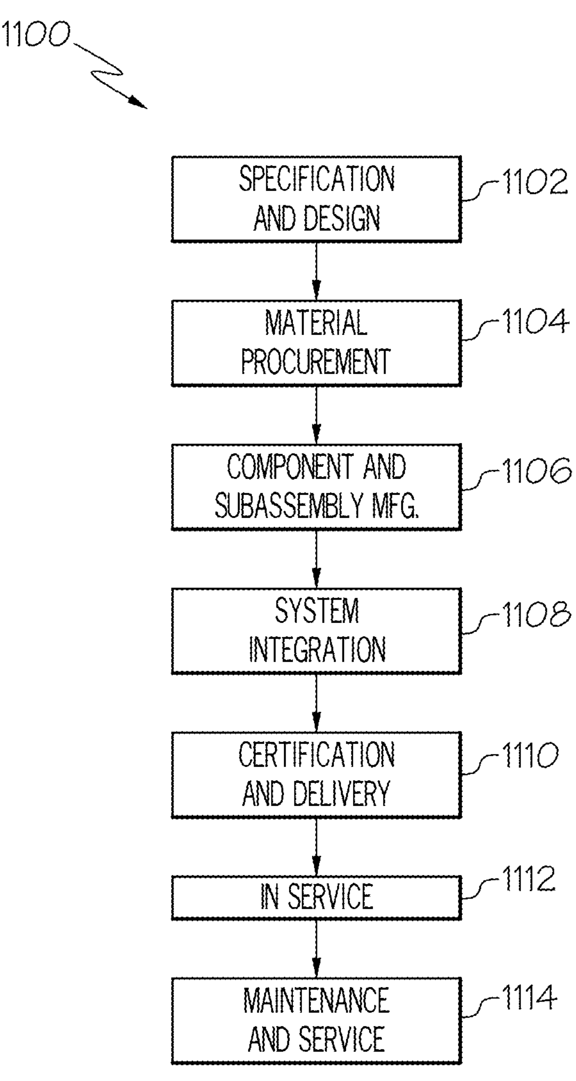
FIG. 13 is a flow diagram of an example of an aircraft manufacturing and service method.
Figure 14:
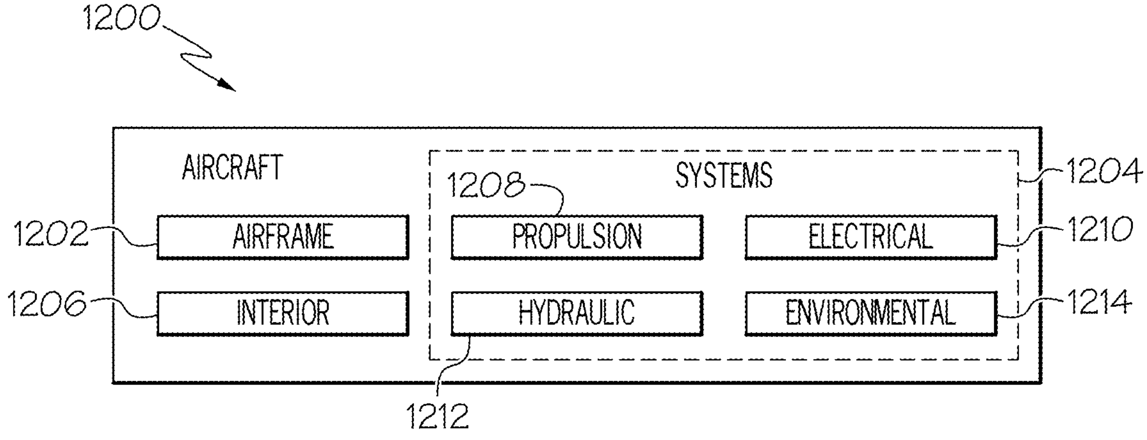
FIG. 14 is a schematic block diagram of an example of an aircraft.

Referring now to FIGS. 11-14, examples of the system 100 and the method 1000 described herein, may be related to, or used in the context of, the aerospace manufacturing and service method 1100, as shown in the flow diagram of FIG. 13 and an aircraft 1200, as schematically illustrated in FIG. 14. As an example, the aircraft 1200 and/or the manufacturing and service method 1100 may include or utilize composite components that are locally cured or repaired using the system 100 and/or according to the method 1000.

Examples of the presently disclosed system 100 and method 1000 may be used in any suitable industry, for the manufacture of any desired composite material. Although the examples provided herein are described in the context of aircraft manufacturing and service, these are merely illustrative examples, and should not be considered limiting the applicability of the disclosed systems and methods in any way.

FIG. 11 illustrates an example of the aircraft 1200. The aircraft 1200 can be any aerospace vehicle or platform. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In yet other examples, the onboard systems 1204 also include one or more other systems, such as, but not limited to, communications systems, avionics systems, software distribution systems, network communications systems, passenger information/entertainment systems, guidance systems, radar systems, weapons systems, and the like. Each of the systems can include various subsystems, such as controllers, processors, actuators, effectors, motors, generators, etc., depending on the functionality involved.

The aircraft 1200 can have any number of composite structures at least a portion of which can be locally cured using the system 100 and/or according to the method 1000. Any component or substructure of an aircraft that lends itself to composite manufacture can be compatible with the illustrative methods and processes described herein, including without limitation structural components, fuselage panels, bulkhead sections, and the like. In one example, the presently described system 100 and method 1000 are particularly useful for the manufacture and/or repair of stiffeners, or stringers, used in aircraft manufacture.

Referring to FIGS. 11 and 12, in one or more examples, the aircraft 1200 includes one or more stiffeners 220 configured to carry loads. In some examples, the stiffeners 220 are attached to skins 222 to improve the strength, stiffness, and/or buckling resistance of the skins 222. The stiffeners 220 can be included in any suitable part of the aircraft frame (e.g., airframe 1202) and/or any other suitable part of aircraft 1200. FIGS. 11 and 12 illustrate the stiffeners 220 reinforcing the skin 222, such as, in an illustrative example of a wing 224 of the aircraft 1200.

FIG. 11 illustrates an example of the composite structure 200 in the form of the stiffener 220 (e.g., a composite hat stiffener). In one or more examples, the stiffener 220 includes a cap 232 and a first sidewall 234 and second sidewall 236 extending from opposing side portions of the cap 232. In the illustrative example, the first sidewall 234 and second sidewall 236 extend from cap 232 at obtuse angles. In other examples, the first sidewall 234 and second sidewall 236 can form acute angles or substantially right angles with cap 232. The angle between cap 232 and first sidewall 234 may or may not be equal to the angle between cap 232 and second sidewall 236. The cap 232 can be substantially planar or can include curved and/or angled portions. The stiffeners 220 also includes a first flange 238 extending from first sidewall 234 and second flange 242 extending from second sidewall 236. The first flange 238 and second flange 242 extend away from each other in opposing directions and can be parallel to the cap 232 (e.g., the first and second flanges can be coplanar and can define a plane that is parallel to a plane generally defined by the cap). The first flange 238 and second flange 242 have respective bottom surfaces that can be attached to the skin 222 so that the stiffener 220 is configured to reinforce, stiffen, and strengthen the skin 222. A plurality of the stiffeners 220 can be attached to an expanse of the skin 222.

FIG. 12 illustrates an example of the composite structure 200 in the form of a portion of the wing 224 of the aircraft 1200. In various examples, the stiffeners 220 are attached to the skin 222 by curing the stiffener 220 and the skin 222 while they are held together, or by curing the stiffener 220 and the skin 222 separately and then fastening the stiffener 220 to the skin 222. In various examples, the stiffeners 220 and the skins 222 can each include one or more polymer materials, thermoplastic materials, thermosetting materials, and/or any other suitable materials depending on the desired properties for the finished workpiece.

Often, composite stiffeners or stringers, for example, are applied to fuselage sections and wing skins in order to confer stiffness and strength to the aircraft panels to which they are attached while economizing on weight. For strength and rigidity, a stiffener may exhibit a concave cross-section with projecting extensions. The stiffener may additionally incorporate an overall curvature in order to match the curve of the fuselage to which it will be attached. Yet further, the stiffener may include one or more bends, or joggles, in order to accommodate one or more aircraft systems. Due to these constraints, the resulting stiffener may have a size and shape that makes it difficult to transport to and from an industrial autoclave or may even prevent the autoclave from accommodating the uncured stiffener. However, such a composite stiffener can be readily accommodated by the constraining container 102 that is sized and shaped for that stiffener and/or for a localized portion of the stiffener. An uncured, partially cured, or to be repaired composite stiffener can be disposed upon a rigid form (e.g., base 104) constructed so as to define and incorporate the desired cross-sectional profile, the desired curvature, and the desired joggles in the stiffener. The composite stiffener can then readily be cured while disposed upon the rigid form while the requisite pressure is applied to the composite by a suitable expandable element (e.g., expandable medium 130). Similarly, areas on a composite panel forming the fuselage and/or the wing may need repair. In such cases, it is challenging to accommodate the repair using an autoclave. However, such a composite panel can be readily accommodated by the constraining container 102 that is easily mobile for curing repair areas on the fuselage or wing.

Referring to FIG. 13, during pre-production of the aircraft 1200, the manufacturing and service method 1100 includes specification and design 1102 of the aircraft 1200 and material procurement 1104. During production of the aircraft 1200, component and subassembly manufacturing 1106 and system integration 1108 of the aircraft 1200 take place. Thereafter, the aircraft 1200 goes through certification and delivery 1110 to be placed in service 1112. Routine maintenance and service 1114 includes modification, reconfiguration, refurbishment, etc. of one or more systems of the aircraft 1200.

Each of the processes of the manufacturing and service method 1100 illustrated in FIG. 13 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the system 100 and the method 1000, shown and described herein, may be employed during any one or more of the stages of the manufacturing and service method 1100 shown in the flow diagram illustrated by FIG. 13. In an example, at least a portion of a composite structure can be locally cured using the system 100 and/or according to the method 1000 during a portion of component and subassembly manufacturing 1106 and/or system integration 1108. Further, at least a portion of a composite structure can be locally cured using the system 100 and/or according to the method 1000 while the aircraft 1200 is in service 1112. Also, at least a portion of a composite structure can be locally cured using the system 100 and/or according to the method 1000 during system integration 1108 and certification and delivery 1110. Similarly, at least a portion of a composite structure can be locally cured using the system 100 and/or according to the method 1000 while the aircraft 1200 is in service 1112 and during maintenance and service 1114.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1, 3-12 and 14, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1, 3-12 and 14, referred to above, need be included in every example and not all elements, features, and/or components described herein are necessarily depicted in each illustrative example. Accordingly, some of the elements, features, and/or components described and illustrated in FIGS. 1, 3-12 and 14 may be combined in various ways without the need to include other features described and illustrated in FIGS. 1, 3-12 and 14, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1, 3-12 and 14, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1, 3-12 and 14, and such elements, features, and/or components may not be discussed in detail herein with reference to each of FIGS. 1, 3-12 and 14. Similarly, all elements, features, and/or components may not be labeled in each of FIGS. 1, 3-12 and 14, but reference numerals associated therewith may be utilized herein for consistency.

In FIGS. 2 and 13, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 2 and 13 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100 and the method 1000 have been shown and described, modifications may occur to those skilled in the art upon reading the specification. The present application includes such modifications and is limited only by the scope of the claims.

What is claimed is:

1. A method comprising:

enclosing a portion of a composite structure and an initial volume of an expandable medium within an interior volume formed by a constraining container and the composite structure;

holding at least a portion of the constraining container against the composite structure;

producing a predetermined change in at least one of an internal cellular structure or a chemical state of the expandable medium thereby expanding the expandable medium disposed within the interior volume formed by the constraining container and the composite structure toward a predetermined volume that is greater than the interior volume and applying positive pressure to the composite structure; and curing the composite structure under the positive pressure.

2. The method of claim 1, further comprising moving the cover relative to the composite structure.

3. The method of claim 1, wherein:

the composite structure comprises a plurality of composite layers; and at least a portion of the plurality of composite layers is uncured or partially cured.

4. The method of claim 3, wherein at least one of the plurality of composite layers is a composite patch configured to repair a portion of a composite surface of the composite structure.

5. The method of claim 1, further comprising selectively varying the interior volume formed by the constraining container and the composite structure.

6. The method of claim 1, further comprising:

applying a casting between the expandable medium and a composite surface of the composite structure; and hardening the casting.

7. The method of claim 1, further comprising supporting at least the portion of the composite structure on a base of the constraining container.

8. The method of claim 7, further comprising coupling a cover of the constraining container to the base.

9. The method of claim 1, further comprising increasing a temperature of the expandable medium to at least an activation temperature.

10. The method of claim 8, wherein the cover is thermally reflective.

11. The method of claim 8, wherein the cover comprises a plurality of walls.

12. The method of claim 11, further comprising moving at least one wall of the plurality of walls to modify the interior volume of the cover.

13. The method of claim 1, wherein a cover of the constraining container comprises an overlay that is flexible and non-expandable.

14. The method of claim 1, wherein a cover of the constraining container is held against the composite structure by a retainer.

15. The method of claim 14, wherein the retainer comprises at least one clamp.

16. The method of claim 1, wherein the composite structure comprises polymer materials and fiber reinforcement materials.

17. The method of claim 1, wherein the curing the composite structure comprises heating the composite structure.

18. A method comprising:

enclosing a portion of a composite structure and an initial volume of an expandable medium within an interior volume formed by a constraining container and the composite structure, wherein the composite structure comprises a plurality of composite layers, and wherein and at least composite layer of the plurality of composite layers is uncured or partially cured;

holding at least a portion of the constraining container against the composite structure;

producing a predetermined change in at least one of an internal cellular structure or a chemical state of the expandable medium thereby expanding the expandable medium disposed within the interior volume formed by the constraining container and the composite structure toward a predetermined volume that is greater than the interior volume and applying positive pressure to the composite structure;

selectively varying the interior volume formed by the constraining container and the composite structure thereby controlling the positive pressure to the composite structure; and curing the composite structure under the positive pressure.

19. The method of claim 18, wherein the curing the composite structure comprises heating the composite structure.

20. The method of claim 1, wherein producing the predetermined change in at least one of the internal cellular structure or the chemical state of the expandable medium comprises heating the expandable medium.

* * * * *